US008094091B2

(12) United States Patent
Noma

(10) Patent No.: US 8,094,091 B2
(45) Date of Patent: Jan. 10, 2012

(54) INFORMATION PRESENTING APPARATUS, METHOD, AND COMPUTER PROGRAM PRODUCT

(75) Inventor: Tatsuyoshi Noma, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/843,784

(22) Filed: Jul. 26, 2010

(65) Prior Publication Data

US 2011/0140994 A1 Jun. 16, 2011

(30) Foreign Application Priority Data

Dec. 15, 2009 (JP) ................................. 2009-284300

(51) Int. Cl.
*G09G 1/06* (2006.01)
*G06T 15/10* (2011.01)
*G06T 15/20* (2011.01)
(52) U.S. Cl. ................... 345/8; 345/7; 345/427
(58) Field of Classification Search ............. 345/7–9
See application file for complete search history.

(56) References Cited

U.S. PATENT DOCUMENTS

| 6,045,229 | A | 4/2000 | Tachi et al. | |
|---|---|---|---|---|
| 6,297,804 | B1 | 10/2001 | Kashitani | |
| 2002/0113756 | A1* | 8/2002 | Tuceryan et al. | 345/8 |
| 2008/0158096 | A1* | 7/2008 | Breed | 345/7 |
| 2009/0128564 | A1* | 5/2009 | Okuno | 345/427 |
| 2010/0164990 | A1 | 7/2010 | Van Doorn | |

FOREIGN PATENT DOCUMENTS

| JP | 10-112831 | 4/1998 |
|---|---|---|
| JP | 2000-056896 | 2/2000 |
| JP | 2003-244726 | 8/2003 |
| JP | 2009-505268 | 2/2009 |
| JP | 2009-123018 | 6/2009 |
| WO | 2007/020591 | 2/2007 |

OTHER PUBLICATIONS

Japanese Patent Application No. 2009-284300; Notice of Rejection; Mailed Sep. 28, 2010 (English translation).

* cited by examiner

*Primary Examiner* — Alexander S Beck
*Assistant Examiner* — Charles Hicks
(74) *Attorney, Agent, or Firm* — Blakely, Sokoloff, Taylor & Zafman LLP

(57) ABSTRACT

According to one embodiment, an information presenting apparatus includes: point-of-view position identifying module; line-of-sight direction identifying module; visibility range indentifying module; memory module; placement module; image generating module; and display control module. The visibility range identifying module identifies visibility range o based on a point-of-view position and a line-of-sight direction. The memory module stores a virtual object and its position. The placement module reads the virtual object at a position included in the visibility range and to virtually place the virtual object at a corresponding position in the real-world space. The image generating module generates an image for left eye and an image for right eye. The display control module displays the image for left eye on the display module disposed for the left eye and to display the image for right eye on the display module disposed for the right eye.

10 Claims, 18 Drawing Sheets

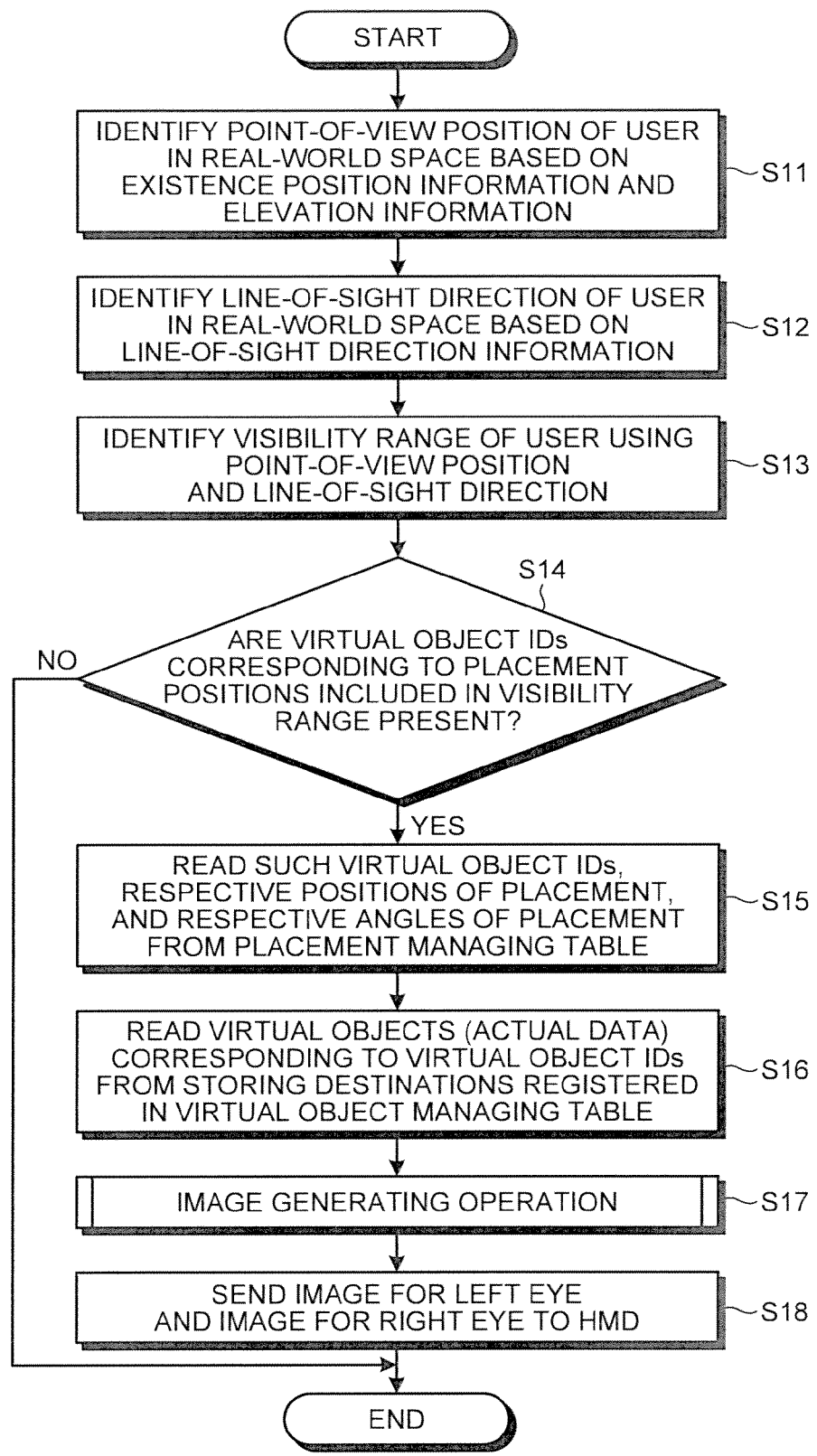

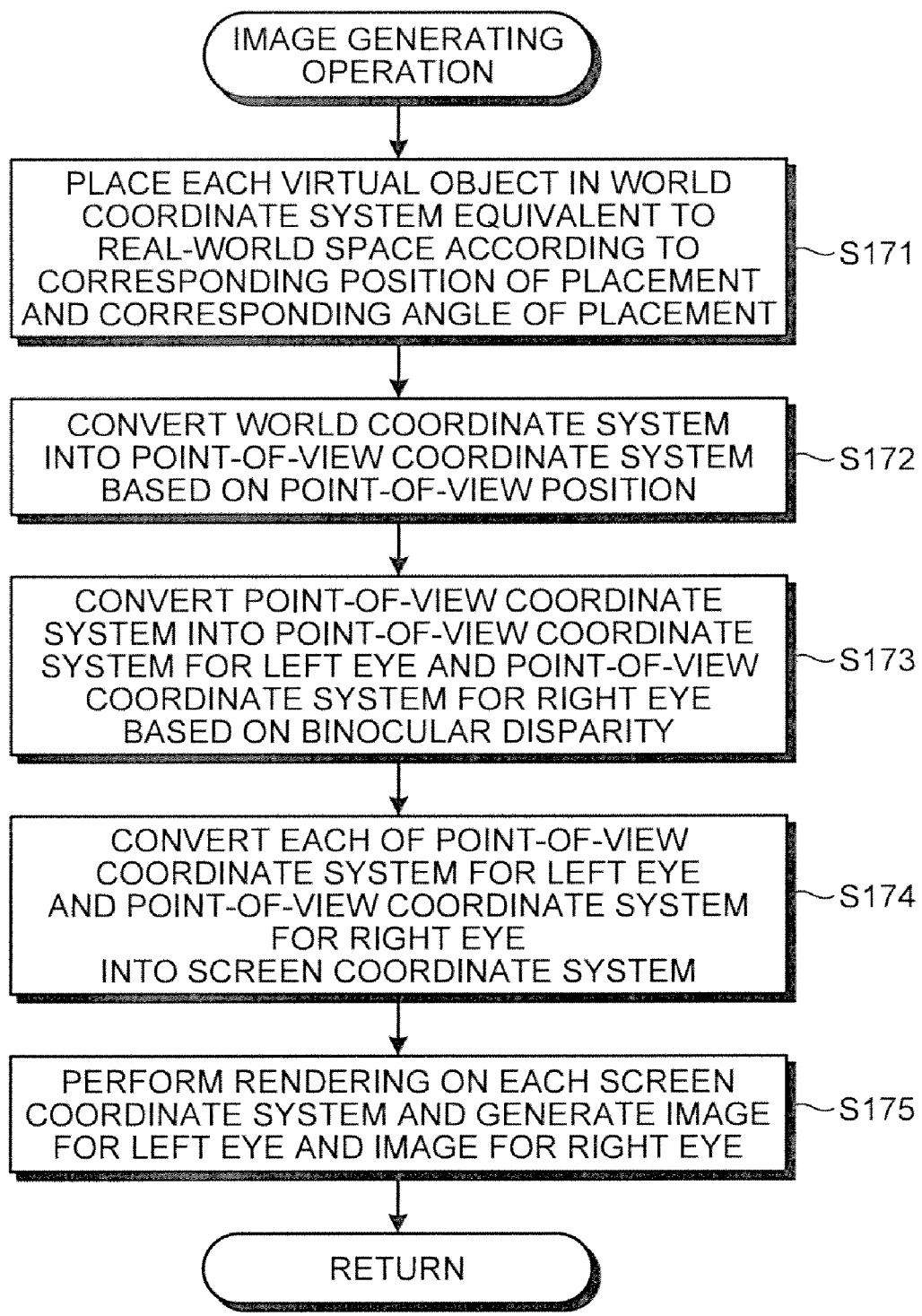

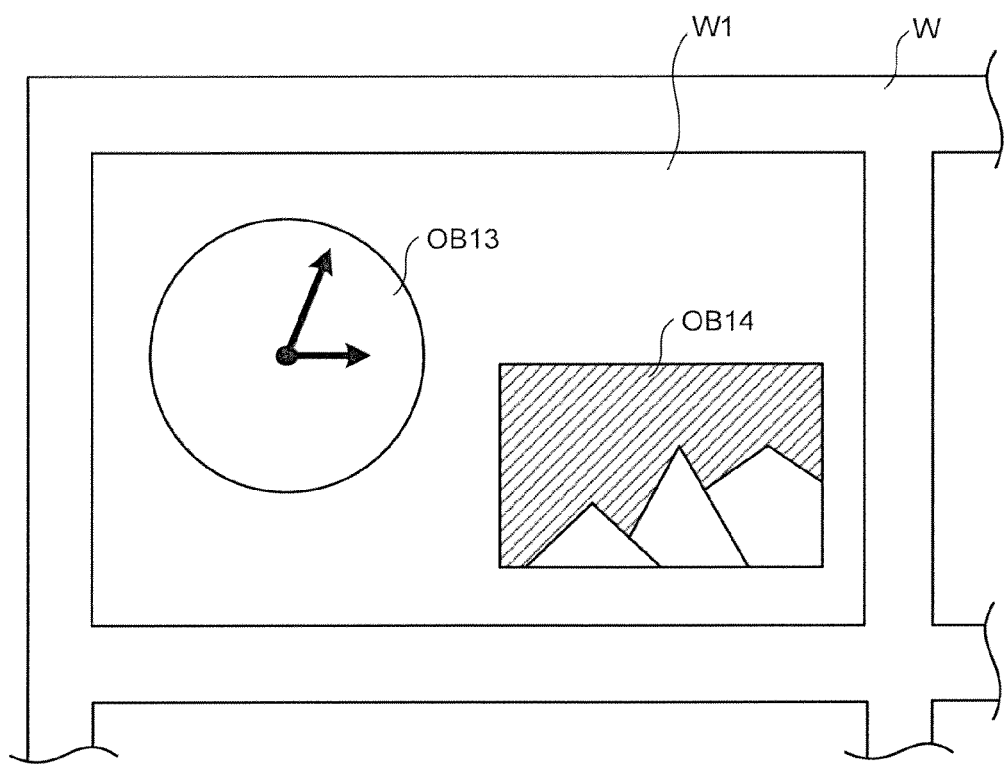

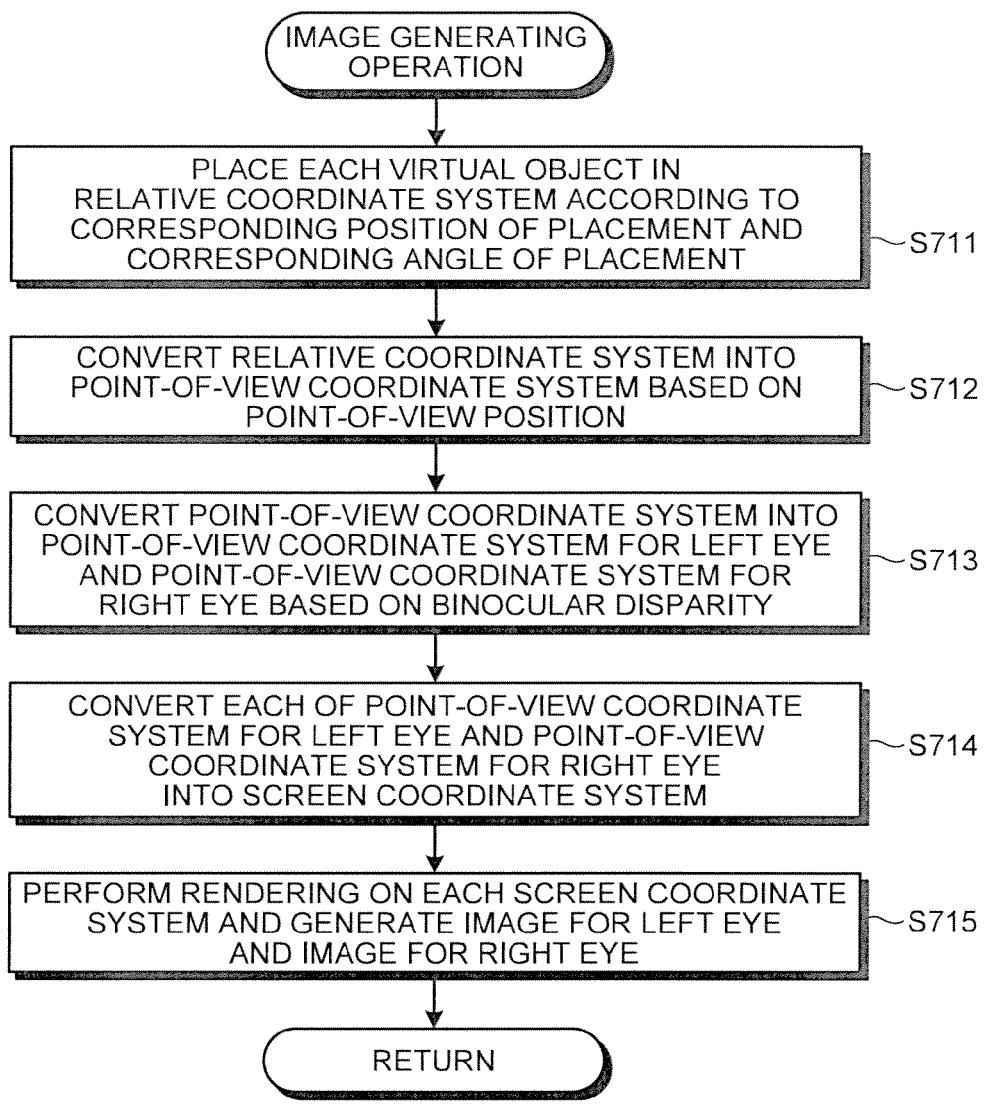

INFORMATION PRESENTING APPARATUS, METHOD, AND COMPUTER PROGRAM PRODUCT

CROSS-REFERENCE TO RELATED APPLICATIONS

This application is based upon and claims the benefit of priority from Japanese Patent Application No. 2009-284300, filed Dec. 15, 2009, the entire contents of which are incorporated herein by reference.

FIELD

Embodiments described herein relate generally to an information presenting apparatus, an information presenting method, and a computer program product for presenting virtual objects to the user via a transmissive head-mounted display.

BACKGROUND

There already exists a technology called augmented reality for additional presentation of computer graphics (CG) by superimposing it over a real-world scene. In the augmented reality technology, a transmissive head-mounted display (hereinafter, "HMD") having a transparent view is used as the display device for presenting information. For example, Published Japanese Translation No. 2009-505268 of the PCT International Application discloses a technology regarding a pair of augmented reality glasses that enables an end-user programmer to view an environment of ambient intelligence having a physical size in such a way that the mechanisms/patterns of virtual interaction (virtual objects) in the environment of ambient intelligence appear superimposed over positions, surfaces, objects, and devices in the real-world environment.

In the technology disclosed in Published Japanese Translation No. 2009-505268 of the PCT International Application, although virtual objects are displayed by superimposition over the real-world space through the transmissive HMD (pair of augmented reality glasses); no consideration is given to the binocular disparity of users. Hence, an image from a single point of view is provided to both the eyes of a user. That leads to a sense of discomfort while viewing real-world objects along with virtual objects thereby spoiling the sense of reality of the virtual objects. Besides, in the technology disclosed in Published Japanese Translation No. 2009-505268 of the PCT International Application, when hands of the user come in between the position of the point of view of the user and the position of placement of a virtual object; the virtual object appears on the hands of the user in a superimposed manner thereby spoiling the sense of reality of that virtual object. Moreover, in the technology disclosed in Published Japanese Translation No. 2009-505268 of the PCT International Application, although a virtual object can be placed at a fixed position within the real-world space, it is not possible to place a virtual object in a moving object such as an automobile that moves within the real-world space.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an exemplary flowchart for explaining the sequence in an information presenting operation in the first embodiment;

FIG. 7 is an exemplary flowchart for explaining the sequence in an image generating operation in the first embodiment;

FIG. 9B is an exemplary illustration of a virtual object presented to the user illustrated in FIG. 9A in the first embodiment;

FIG. 19 is an exemplary flowchart for explaining the sequence in an image generating operation in the second embodiment;

DETAILED DESCRIPTION

Figure 1:
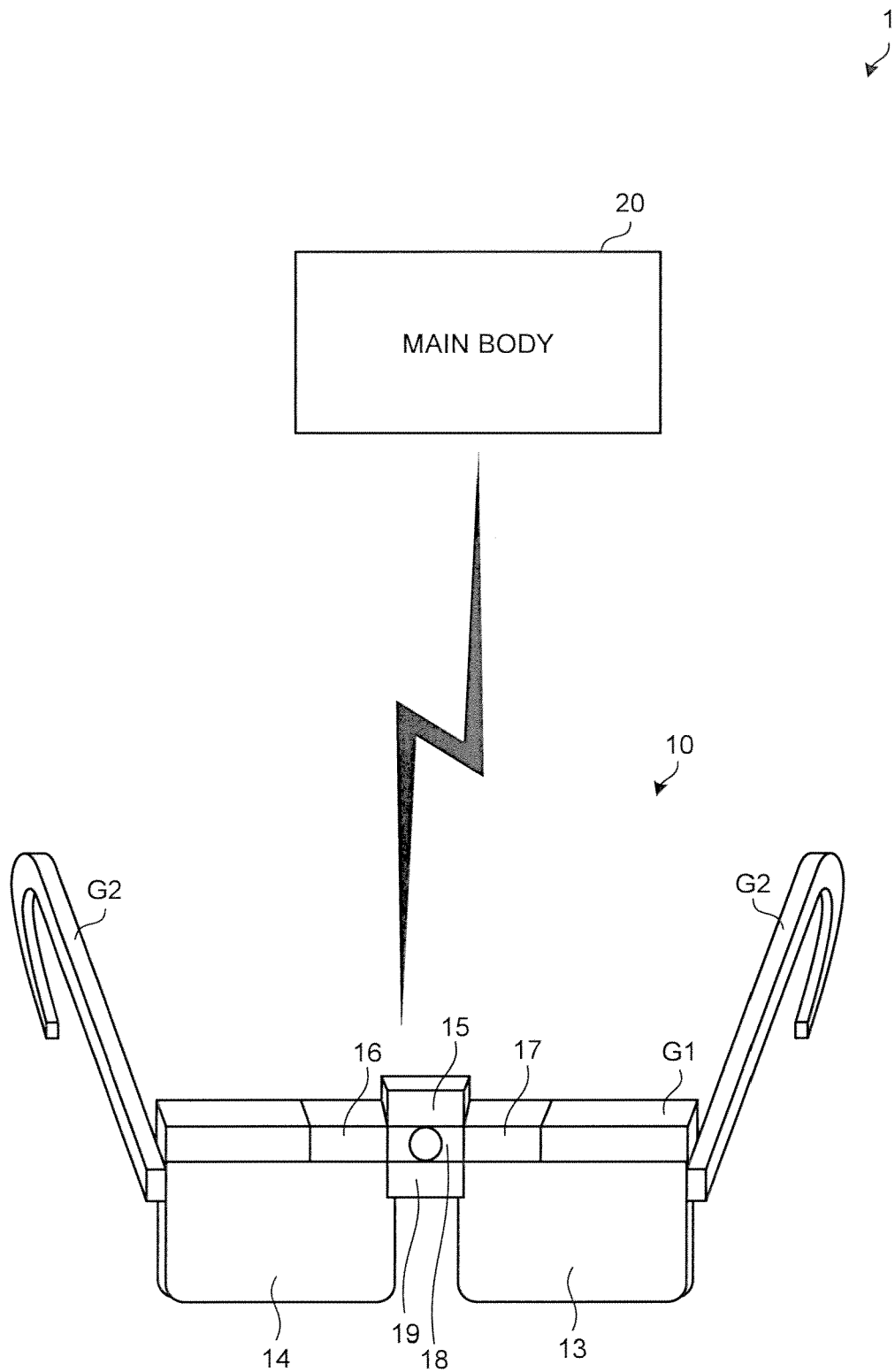
FIG. 1 is an exemplary schematic diagram of a configuration of an information presenting apparatus according to a first embodiment.

In general, according to one embodiment, an information presenting apparatus presents information using a transmissive head-mounted display equipped with a display module for each eye of a wearer. The information presenting apparatus comprises: a point-of-view position identifying module; a line-of-sight direction identifying module; a visibility range identifying module; a memory module; a placement module; an image generating module; and a display control module. The point-of-view position identifying module is configured to identify a point-of-view position of the wearer based on position of existence and height of the head-mounted display in real-world space. The line-of-sight direction identifying module is configured to identify a line-of-sight direction of the wearer by making use of a tilt of the head-mounted display. The visibility range identifying module is configured to identify visibility range of the wearer based on the point-of-view position and the line-of-sight direction. The memory module is configured to store, in a corresponding manner, a virtual object representing a predetermined target and a position of placement of the virtual object. The placement module is configured to read, from the memory module, a virtual object at a position of placement included in the visibility range and, based on the position of placement associated with the virtual object, to virtually place the virtual object at a corresponding position in the real-world space. The image generating module is configured to generate an image for left eye and an image for right eye that represent a placement status of the virtual object when viewed from a left eye and a right eye, respectively, of the wearer. The display control module is configured to display the image for left eye on the display module disposed for the left eye of the wearer and to display the image for right eye on the display module disposed for the right eye of the wearer.

According to another embodiment, an information presenting method presents information using a transmissive head-mounted display equipped with a display module for each eye of a wearer. The information presenting method comprises: first-identifying, by a point-of-view position identifying module, that includes identifying a point-of-view position of the wearer based on position of existence and height of the head-mounted display in real-world space; second-identifying, by a line-of-sight direction identifying module, that includes identifying a line-of-sight direction of the wearer by making use of a tilt of the head-mounted display; third-identifying, by a visibility range identifying module, that includes identifying visibility range of the wearer based on the point-of-view position and the line-of-sight direction; placing, by a placement module, that includes reading, from the memory module, a virtual object at a position of placement included in the visibility range and, based on the position of placement associated with the virtual object, virtually placing the virtual object at a corresponding position in the real-world space; generating, by an image generating module, an image for left eye and an image for right eye that represent a placement status of the virtual object when viewed from a left eye and a right eye, respectively, of the wearer; and display-controlling, by a display control module, that includes displaying the image for left eye on the display module disposed for the left eye of the wearer and displaying the image for right eye on the display module disposed for the right eye of the wearer.

According to still another embodiment, a computer program product having a computer readable medium including programmed instructions that, when executed by a computer of an information presenting apparatus for presenting information using a transmissive head-mounted display equipped with a display module for each eye of a wearer, cause the computer to perform: first-identifying, by a point-of-view position identifying module, that includes identifying a point-of-view position of the wearer based on position of existence and height of the head-mounted display in real-world space; second-identifying, by a line-of-sight direction identifying module, that includes identifying a line-of-sight direction of the wearer by making use of a tilt of the head-mounted display; third-identifying, by a visibility range identifying module, that includes identifying visibility range of the wearer based on the point-of-view position and the line-of-sight direction; placing, by a placement module, that includes reading, from the memory module, a virtual object at a position of placement included in the visibility range and, based on the position of placement associated with the virtual object, virtually placing the virtual object at a corresponding position in the real-world space; generating, by an image generating module, an image for left eye and an image for right eye that represent a placement status of the virtual object when viewed from a left eye and a right eye, respectively, of the wearer; and display-controlling, by a display control module, that includes displaying the image for left eye on the display module disposed for the left eye of the wearer and displaying the image for right eye on the display module disposed for the right eye of the wearer.

Various embodiments of an information presenting apparatus, an information presenting method, and a computer program product according to the invention will be described hereinafter with reference to the accompanying drawings.

FIG. 1 is an exemplary schematic diagram of a configuration of an information presenting apparatus according to a first embodiment. As illustrated in FIG. 1, an information presenting apparatus 1 according to the first embodiment comprises a transmissive head-mounted display (HMD) 10 and a main body 20.

The HMD 10 is manufactured in the form of a pair of glasses and comprises a frame portion G1 that is positioned in front of the eyes of the user and temples G2 that are attached to both ends in the direction of the frame portion G1. The frame portion G1 comprises a display module for left eye 13 and a display module for right eye 14 described later. The display module for left eye 13 and the display module for right eye 14 are placed in front of the left eye and the right eye, respectively, of the user. At the top portion, the frame portion G1 comprises a position detecting module 15, a line-of-sight direction detecting module 16, an elevation detecting module 17, an image capturing module 18, and a distance measuring module 19 described later. Meanwhile, regarding the position detecting module 15, the line-of-sight direction detecting module 16, the elevation detecting module 17, the image capturing module 18, and the distance measuring module 19; the positions of placement or the number of disposed modules is not limited to the example illustrated in FIG. 1.

Figure 2:
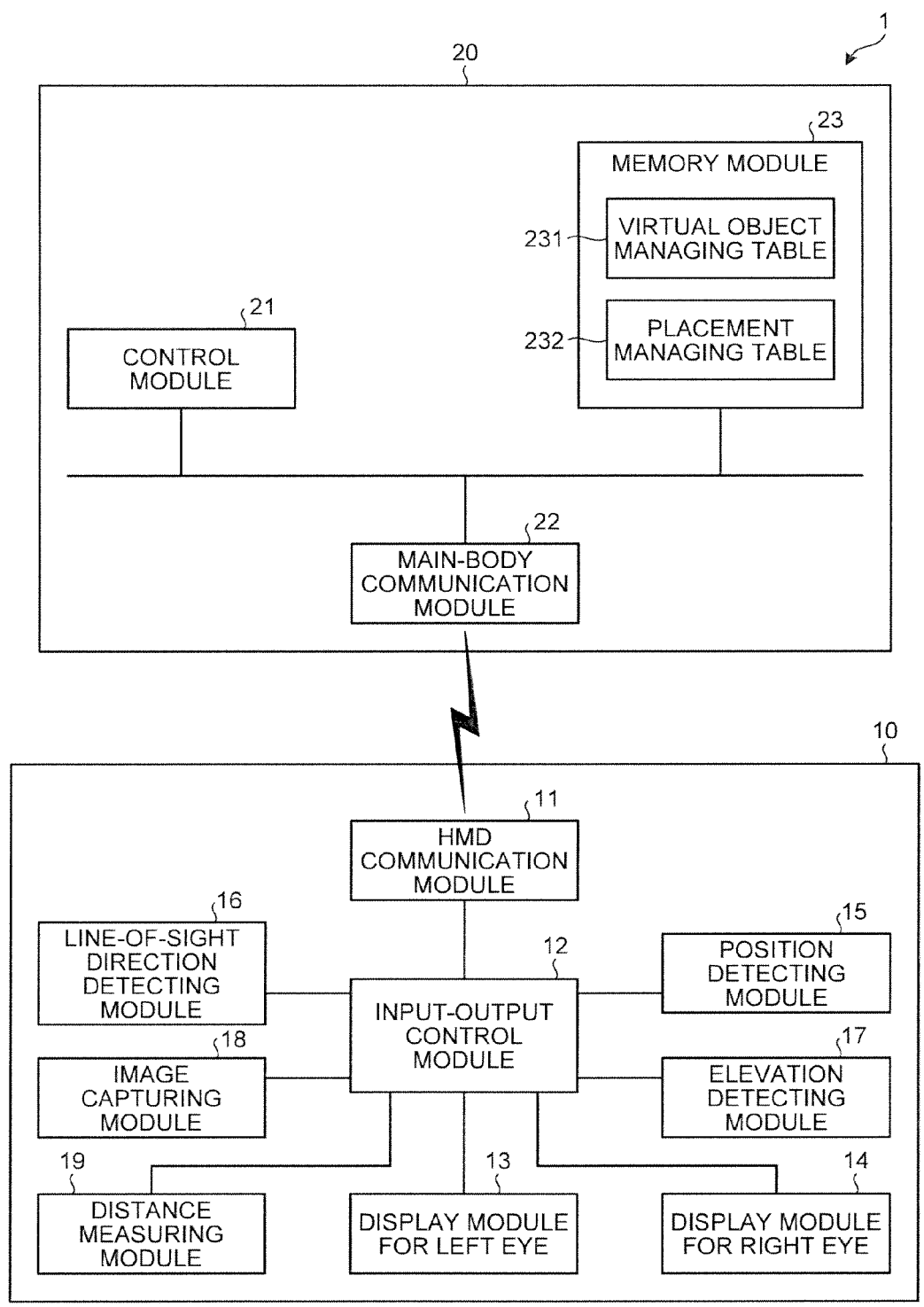
FIG. 2 is an exemplary block diagram of a hardware configuration of the information presenting apparatus in the first embodiment.

FIG. 2 is an exemplary block diagram of a hardware configuration of the information presenting apparatus 1. As illustrated in FIG. 2, the HMD 10 comprises an HMD communication module 11, an input-output control module 12, the display module for left eye 13, the display module for right eye 14, the position detecting module 15, the line-of-sight direction detecting module 16, the elevation detecting module 17, the image capturing module 18, and the distance measuring module 19.

The HMD communication module 11 is a communication interface for performing communication of a variety of information with the main body 20 (i.e., with a main-body communication module 22 described later). There are no particular limitations on the transmission method employed by the HMD communication module 11. For example, the transmission method can be based on the universal serial bus (USB) standard or the Bluetooth (registered trademark) standard.

The input-output control module 12 outputs, to the main body 20 via the HMD communication module 11, a variety of information received from the constituent elements of the HMD 10 (i.e., from the position detecting module 15, the line-of-sight direction detecting module 16, the elevation detecting module 17, the image capturing module 18, and the distance measuring module 19). Besides, the input-output control module 12 outputs, to the display module for left eye 13 and the display module for right eye 14, respectively, an image for left eye and an image for right eye (described later) that are input from the main body 20 via the HMD communication module 11.

The display module for left eye 13 comprises a display element (not illustrated) such as a liquid crystal display (LCD) and an optical system (not illustrated) such as a lens and displays an image for left eye, which is input from the input-output control module 12, to the left eye of the user while also allowing the user to observe the real-world scene. The display module for right eye 14 has an identical structure to that of the display module for left eye 13 and displays an image for right eye, which is input from the input-output control module 12, to the right eye of the user while also allowing the user to observe the real-world scene.

The position detecting module 15 detects the position of existence in the horizontal direction (e.g., latitude/longitude) of the HMD 10 present in the real-world space and outputs that information to the input-output control module 12 as existence position information regarding the user who is wearing the HMD 10. Meanwhile, there are no particular limitations on the method of detecting the position of existence. For example, if the position detecting module 15 is configured to be a global positioning system (GPS) receiver, then it outputs the existence position information measured by the GPS satellite to the input-output control module 12. Apart from that, the position detecting module 15 can be configured as an existence positioning device that measures the position of existence using an access point of the wireless fidelity (Wi-Fi) network, or configured as a gyroscopic device, or configured as a geomagnetism sensor.

The line-of-sight direction detecting module 16 is a gyroscopic sensor or an electronic compass that detects the tilt of the HMD 10 in the real-world space and outputs that information to the input-output control module 12 as line-of-sight direction information indicating the direction of the line of sight of the user.

The elevation detecting module 17 is a distance measuring sensor or an elevation sensor that detects the position of existence in the vertical direction (elevation) of the HMD 10 and outputs that information to the input-output control module 12 as elevation information indicating the height of the point of view of the user.

The image capturing module 18 comprises an image capturing element (not illustrated) such as a charge-coupled device (CCD) or a complementary meta oxide semiconductor (CMOS) for capturing images within the visibility range of the user wearing the HMD 10 and outputs the captured images to the input-output control module 12.

The distance measuring module 19 is a distance measuring sensor that makes use of infrared light or sound waves for measuring the distance up to a real-world object (such as hands of the user) that is present in the direction of the line of sight of the user and then outputs that distance as distance information to the input-output control module 12. Herein, since the distance measuring module 19 is primarily used for measuring the distance up to the hands of the user that appear in the visibility range of the user, it is desirable to set the measurable distance to, for example, about one meter up to which the hands can be stretched. Meanwhile, it is also possible to use the image capturing module 18 as the distance measuring module 19. In that case, the distance up to an object derived from the focus value of the image capturing module 18 can be used as the distance information.

The main body 20 is an information processing device such as a personal computer (PC), a server device, or a portable device. The main body 20 virtually places the virtual objects in the real-world space within the visibility range of the user and presents an image for left eye and an image for right eye (described later), which represent the placement status of the virtual objects, to the user by using the HMD 10.

As illustrated in FIG. 2, the main body 20 comprises a control module 21, the main-body communication module 22, and a memory module 23. The control module 21 comprises a central processing unit (CPU) (not illustrated), a graphics processing unit (CPU) (not illustrated), a read only memory (ROM) (not illustrated), and a random access memory (RAM) (not illustrated). In cooperation with predetermined programs stored in the memory module 23, the control module 21 intensively controls the operations of each constituent element of the main body 20.

Moreover, in cooperation with predetermined programs stored in the memory module 23, the control module 21 puts into practice the functional modules described later (see FIG. 5) and executes various operations such as an information presenting operation (see FIG. 6) or a virtual object manipulating operation (see FIG. 10).

The main-body communication module 22 is a communication interface for performing communication of a variety of information with the HMD 10 (i.e., with the HMD communication module 11). Although there are no particular limitations on the transmission method employed by the main-body communication module 22, it is assumed that the transmission method employed by the main-body communication module 22 is compatible to the transmission method employed by the HMD communication module 11.

The memory module 23 comprises a memory device (not illustrated) such as a hard disk drive (HDD) or a solid state drive (SSD) that is used to store in advance various programs or a variety of setting information read by the control module 21. Besides, in the memory module 23 are stored a virtual object managing table 231 that is used for managing virtual objects and a placement managing table 232 that is used for managing the positions of placement of the virtual objects.

Herein, a virtual object is two-dimensional CG data or three-dimensional CC data representing a predetermined target. For example, a virtual object can be modeling data representing the shape of a particular article, or can be widget (gadget) having a predetermined function, or can be a graphical user interface (GUI), or can be an information presenting window. In each virtual object, a reference point (e.g., the center of gravity of the virtual object) is set for establishing the position of placement and a reference surface (e.g., one of the surfaces forming the virtual object) is set for establishing the angle of placement. Moreover, the actual data of each virtual object is stored in advance in the memory module 23 or in an external memory device.

Figure 3:
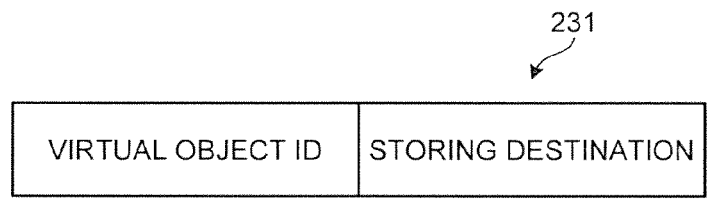
FIG. 3 is an exemplary schematic diagram of data configuration of a virtual object managing table stored in a memory module illustrated in FIG. 2 in the first embodiment.

FIG. 3 is an exemplary schematic diagram of data configuration of the virtual object managing table 231. As illustrated in FIG. 3, in the virtual object managing table 231, virtual object IDs that are allocated in advance for identifying virtual objects are registered in a corresponding manner with the storing destinations at which the actual data corresponding to those virtual object IDs is stored.

Figure 4:
FIG. 4 is an exemplary schematic diagram of data configuration of a placement managing table stored in a memory module illustrated in FIG. 2 in the first embodiment.

FIG. 4 is an exemplary schematic diagram of data configuration of the placement managing table 232. As illustrated in FIG. 4, in the placement managing table 232; virtual object IDs, positions of placement in a virtual coordinate system (hereinafter, "world coordinate system") that is equivalent to the real-world space, and angles of placement at those positions of placement are registered in a corresponding manner. Herein, the positions of placement include the position coordinates (three-dimensional coordinates) of a reference point in the world coordinate system. Moreover, the angles of placement include the tilt of a reference surface (angle of rotation toward the axis direction) in the world coordinate system. Meanwhile, the world coordinate system is used in the field of computer graphics as a virtual coordinate system representing the space (real-world space) in entirety.

Figure 5:
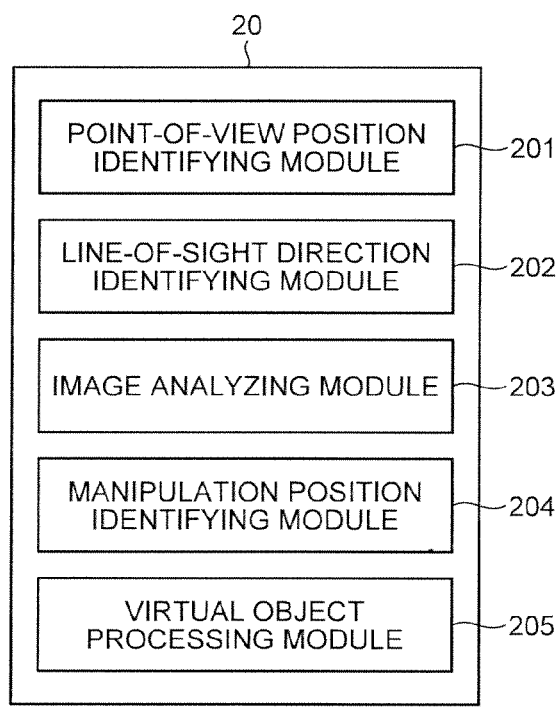
FIG. 5 is an exemplary schematic diagram of a functional configuration of a main body in the first embodiment.

FIG. 5 is an exemplary schematic diagram of a functional configuration of the main body 20. As illustrated in FIG. 5, as a result of coordinated processing by the control module 21 and predetermined programs stored in the memory module 23, the main body 20 comprises a point-of-view position identifying module 201, a line-of-sight direction identifying module 202, an image analyzing module 203, a manipulation position identifying module 204, and a virtual object processing module 205 as the functional modules.

The point-of-view position identifying module 201 identifies, based on the existence position information obtained by the position detecting module 15, the position of existence of the user in the real-world space. Moreover, based on the elevation information obtained by the elevation detecting module 17, the point-of-view position identifying module 201 identifies the height of the point of view of the user in the real-world space. Then, the point-of-view position identifying module 201 specifies three-dimensional information as point-of-view information regarding the user that includes the current position and the point of view of the user.

The line-of-sight direction identifying module 202 identifies the direction of the line of sight of the user based on the line-of-sight direction information obtained by the line-of-sight direction detecting module 16.

The image analyzing module 203 analyzes the images captured by the image capturing module 18 and determines whether the captured images include hand images of the user. If hand images of the user are found in the captured images, then the image analyzing module 203 analyzes the time-oriented variation in the hand images for detecting twisting of the hands (rotation amount) or finger movements. In order to find hand images in the captured images and to analyze the time-oriented variation in the hand images, it is assumed that a known technology such as pattern recognition is implemented.

If the image analyzing module finds hand images in the captured images, the manipulation position identifying module 204 identifies the objects existing in the visibility range of the user, that is, identifies the distance from the HMD 10 to the hands of the user based on the distance information measured by the distance measuring module 19. Moreover, based on the distance up to the hands of the user and on the positions of the hand images in the captured images, the manipulation position identifying module 204 identifies the position of existence of the hands in the real-world space as the manipulation position. Meanwhile, the method of identifying the manipulation position is not limited to this example. That is, alternatively, an existence position detecting device such as a digitizer that measures the position of existence in the real-world space can be strapped to a hand of the user and then the detection result of the position detecting device can be used as the manipulation position.

The virtual object processing module 205 identifies the visibility range of the user wearing the HMD 10 based on the position of the point of view and the direction of the line of sight of that user. There are no particular limitations on the method employed for identifying the visibility range of the user. For example, the visibility range can be identified by employing the following method. Firstly, a spherical space of a predetermined size (e.g., having radius of 3 m) is virtually set around the position of the point of view of the user. Then, with the point-of-view position assumed to be the apex, a conical space that has a substantially conical shape and has a vector line from the point-of-view position toward the line-of-sight direction as its normal is cutout from the spherical space. At that time, by setting the apex angle of the conical space equal to the value corresponding to the actual visibility range of the user, it becomes possible to treat the conical space as the visibility range of the user. Herein, it is assumed that the value of the apex angle of the conical space is stored in advance as part of the setting information.

Besides, the virtual object processing module 205 refers to the placement managing table 232 and determines whether virtual object IDs are present corresponding to the positions of placement included in the visibility range. When such virtual object IDs are present, the virtual object processing module 205 reads the virtual object IDs, the respective positions of placement, and the respective angles of placement from the placement managing table 232. Then, upon reading the virtual objects (actual data) corresponding to those virtual object IDs from the storing destinations registered in the virtual object managing table 231, the virtual object processing module 205 virtually places the virtual objects in the real-world space by placing them in the world coordinate system according to the respective positions of placement and the respective angles of placement. Moreover, based on the virtual objects placed virtually in the real-world space, the virtual object processing module 205 generates an image for left eye and an image for right eye that represent the placement status of each virtual object when viewed from the left eye and the right eye, respectively, of the user and then outputs those images to the HMD 10.

Moreover, according to the details of manipulation with finger movements detected by the image analyzing module 203, the virtual object processing module 205 performs predetermined operations on the virtual objects that were the targets of manipulation. More particularly, if the details of manipulation indicate an instruction for changing the positions of placement or the angles of placement of the virtual objects (hereinafter, collectively referred to as "placement changes"); then, using the displacement in the positions of placement detected by the manipulation position identifying module 204 and the rotation amount detected by the image analyzing module 203, the virtual object processing module 205 sets new positions of placement and new angles of placement. Then, the virtual object processing module 205 registers, in the placement managing table 232, the newly-set positions of placement and the newly-set angles of placement in a corresponding manner with the virtual object IDs of the virtual objects that were the targets of manipulation. Thus, the placement managing table 232 gets updated. Meanwhile, it is assumed that, in each virtual object (actual data), the details of manipulation with finger movements are defined in advance in order to activate the functions of that virtual object.

Explained below with reference to FIGS. 6 to 10 are the operations performed by the information presenting apparatus 1. FIG. 6 is an exemplary flowchart for explaining the sequence in the information presenting operation. Herein, as the precondition for performing the information presenting operation, it is assumed that the user is wearing the HMD 10 and the variety of information obtained by the HMD 10 is sent to the main body 20 via the HMD communication module 11.

Firstly, the point-of-view position identifying module 201 identifies, based on the existence position information and the elevation information input from the HMD 10, the position of the point of view of the user in the real-world space (S11). The line-of-sight direction identifying module 202 then identifies the direction of the line of sight of the user in the real-world space based on the line-of-sight direction information input from the HMD 10 (S12).

Subsequently, by making use of the position of the point of view and the direction of the line of sight identified respectively at S11 and S12, the virtual object processing module 205 identifies the visibility range of the user in the real-world space (S13). Then, the virtual object processing module 205 refers to the placement managing table 232 and determines whether virtual object IDs are present corresponding to the positions of placement included in the visibility range (S14). Herein, if no virtual object ID is found (No at S14), then the information presenting operation is immediately terminated.

On the other hand, if such virtual object IDs are found (Yes at S14), then the virtual object processing module 205 reads the virtual object IDs, the respective positions of placement, and the respective angles of placement from the placement managing table 232 (S15).

Then, the virtual object processing module 205 refers to the virtual object managing table 231 and reads the virtual objects (actual data) corresponding to the virtual object IDs from the storing destinations registered in the virtual object managing table 231 (S16), and performs an image generating operation for generating an image for left eye and an image for right eye (S17). The explanation of the image generating operation performed at S17 is given below with reference to FIG. 7.

FIG. 7 is an exemplary flowchart for explaining the sequence in the image generating operation. Firstly, by using the positions of placement and the angles of placement of the virtual object IDs read at S15, the virtual object processing module 205 places the virtual objects corresponding to those virtual object IDs at the corresponding positions in the world coordinate system (S171).

Subsequently, in order to make the placement status of each virtual object placed in the world coordinate system equivalent to the view from the position of the point of view of the user, the virtual object processing module 205 converts the world coordinate system into a point-of-view coordinate system based on the position of the point of view of the user (S172).

Then, based on the binocular disparity determined by the interocular distance of the user, the virtual object processing module 205 shifts the position of the origin (point-of-view position) in the point-of-view coordinate system to left and right by an amount determined according to the binocular disparity, and generates a point-of-view coordinate system for left eye representing the placement status of each virtual object when viewed from the left eye of the user and generates a point-of-view coordinate system for right eye representing the placement status of each virtual object when viewed from the right eye of the user (S173).

Subsequently, the virtual object processing module 205 converts each of the point-of-view coordinate system for left eye and the point-of-view coordinate system for right eye into a screen coordinate system according to the display on the display module for left eye 13 and the display on the display module for right eye 14, respectively (S174). Then, the virtual object processing module 205 generates an image for left eye by rendering the point-of-view coordinate system for left eye that has been converted into the screen coordinate system and generates an image for right eye by rendering the point-of-view coordinate system for right eye that has been converted into the screen coordinate system (S175) and proceeds to S18 illustrated in FIG. 6.

Herein, in the image generating operation, although the world coordinate system is first converted into the point-of-view coordinate system based on a single point-of-view position and then converted into the point-of-view coordinate system for left eye and the point-of-view coordinate system for right eye; it is also possible to directly convert the world coordinate system into the point-of-view coordinate system for left eye and the point-of-view coordinate system for right eye.

Returning to the explanation with reference to FIG. 6, the virtual object processing module 205 sends the image for left eye and the image for right eye generated in the image generating operation at S17 to the HMD 10 and instructs the HMD 10 to display the image for left eye on the display module for left eye 13 and the image for right eye on the display module for right eye 14 (S18). That marks the end of the information presenting operation.

Explained below with reference to FIG. 8 (FIGS. 8A, 8B, and 8C) and FIG. 9 (FIGS. 9A and 9B) are examples of displaying virtual objects by performing the information presenting operation according to the present embodiment.

Figure 8A:
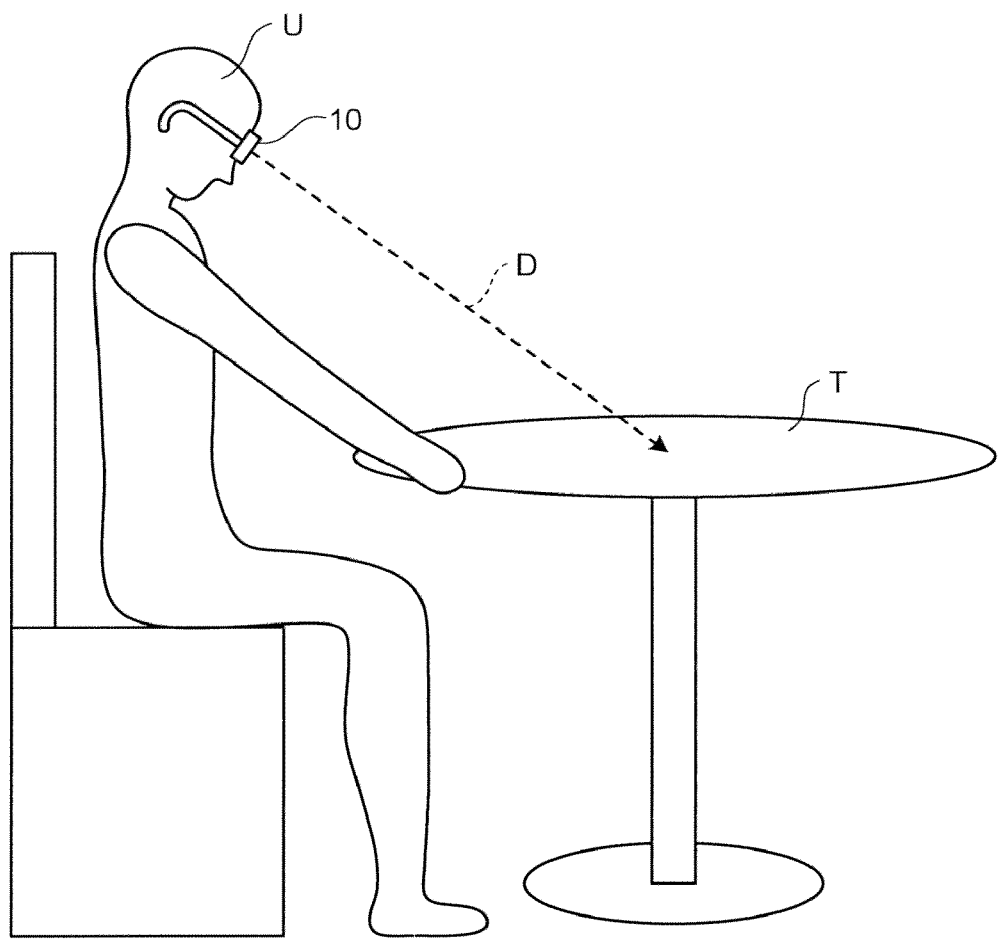
FIG. 8A is an exemplary pictorial diagram for explaining the relation between a user wearing an HMD and a table present in the real-world space in the first embodiment.
Figure 8B:
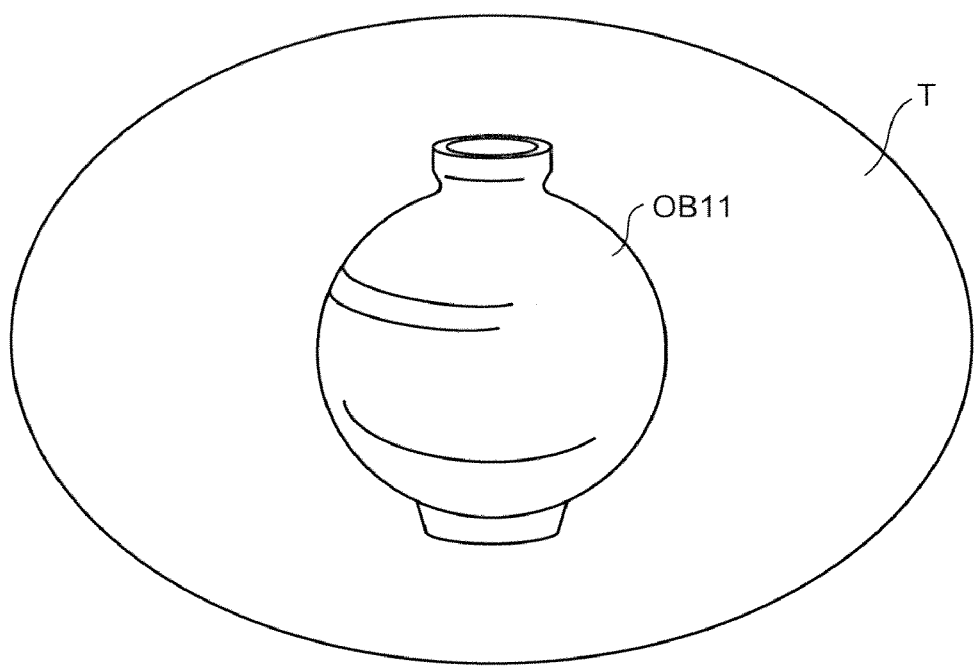
FIG. 8B is an exemplary illustration of a virtual object presented to the user illustrated in FIG. 8A in the first embodiment.

FIG. 8A is an exemplary pictorial diagram for explaining the relation between a user U wearing the HMD 10 and a table T present in the real-world space. As illustrated in FIG. 8A, line-of-sight direction D of the user U is directed toward the top of the table T. Herein, assume that, at a position of placement in the placement managing table 232, a condition of placing a virtual object representing a vase at a predetermined position on the top of the table T is defined. In that case, the information presenting operation is performed so that a virtual object OB11 representing a vase is displayed in front of the eyes of the user U as illustrated in FIG. 8B. Alternatively, assume that, at a position of placement in the placement managing table 232, a condition of placing a virtual object representing a keyboard at a predetermined position on the top of the table T is defined. In that case, the information presenting operation is performed so that a virtual object OB12 representing a keyboard is displayed in front of the eyes of the user U as illustrated in FIG. 8C.

Figure 9A:
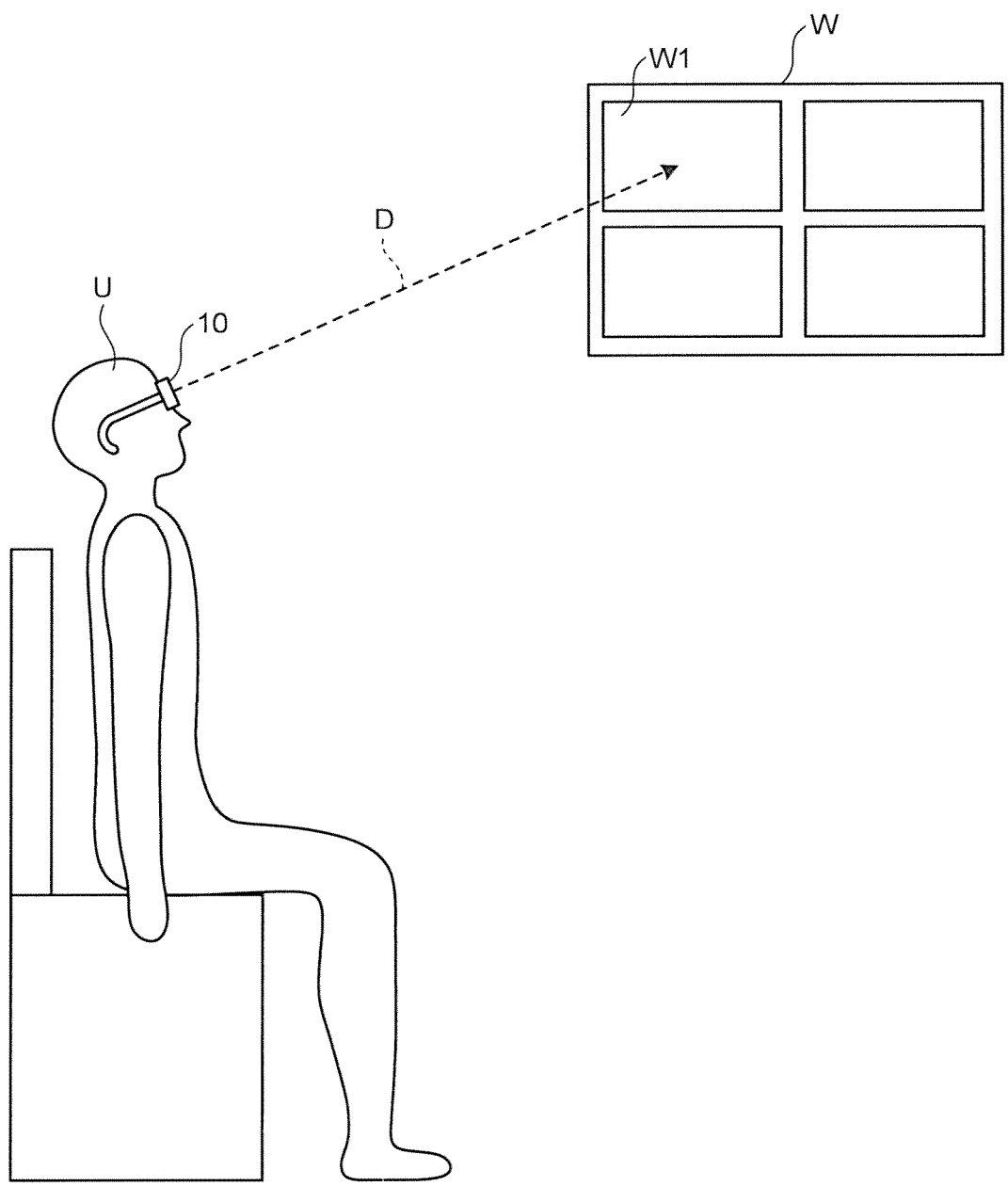
FIG. 9A is an exemplary pictorial diagram for explaining the relation between user wearing an HMD and a window present in the real-world space in the first embodiment.

FIG. 9A is an exemplary pictorial diagram explaining the relation between the user U wearing the HMD 10 and a window W present in the real-world space. As illustrated in FIG. 9A, the line-of-sight direction D of the user U is directed toward an upper left region W1 of the window W. Herein, assume that the placement managing table 232 includes a definition for placing a virtual object representing an analog clock and a virtual object representing a scenic image at predetermined positions on the region W1. In that case, the information presenting operation is performed so that a virtual object OB13 representing an analog clock and a virtual object OB14 representing a scenic image are displayed in front of the eyes of the user U as illustrated in FIG. 9B.

In this way, in the information presenting operation according to the present embodiment, virtual objects are virtually placed at predetermined positions within the visibility range of the user wearing the HMD 10. Then, an image for left eye and an image for right eye that represent the placement status of the virtual objects when viewed from the left eye and the right eye, respectively, of the user are generated and displayed on the display module for left eye 13 and the display module for right eye 14. That enables the user to perceive the virtual object in a sterical manner. Hence, it becomes possible to reduce the sense of discomfort that occurs while viewing the real-world objects along with the virtual objects. That leads to enhancement in the sense of reality of the virtual objects.

Figure 10:
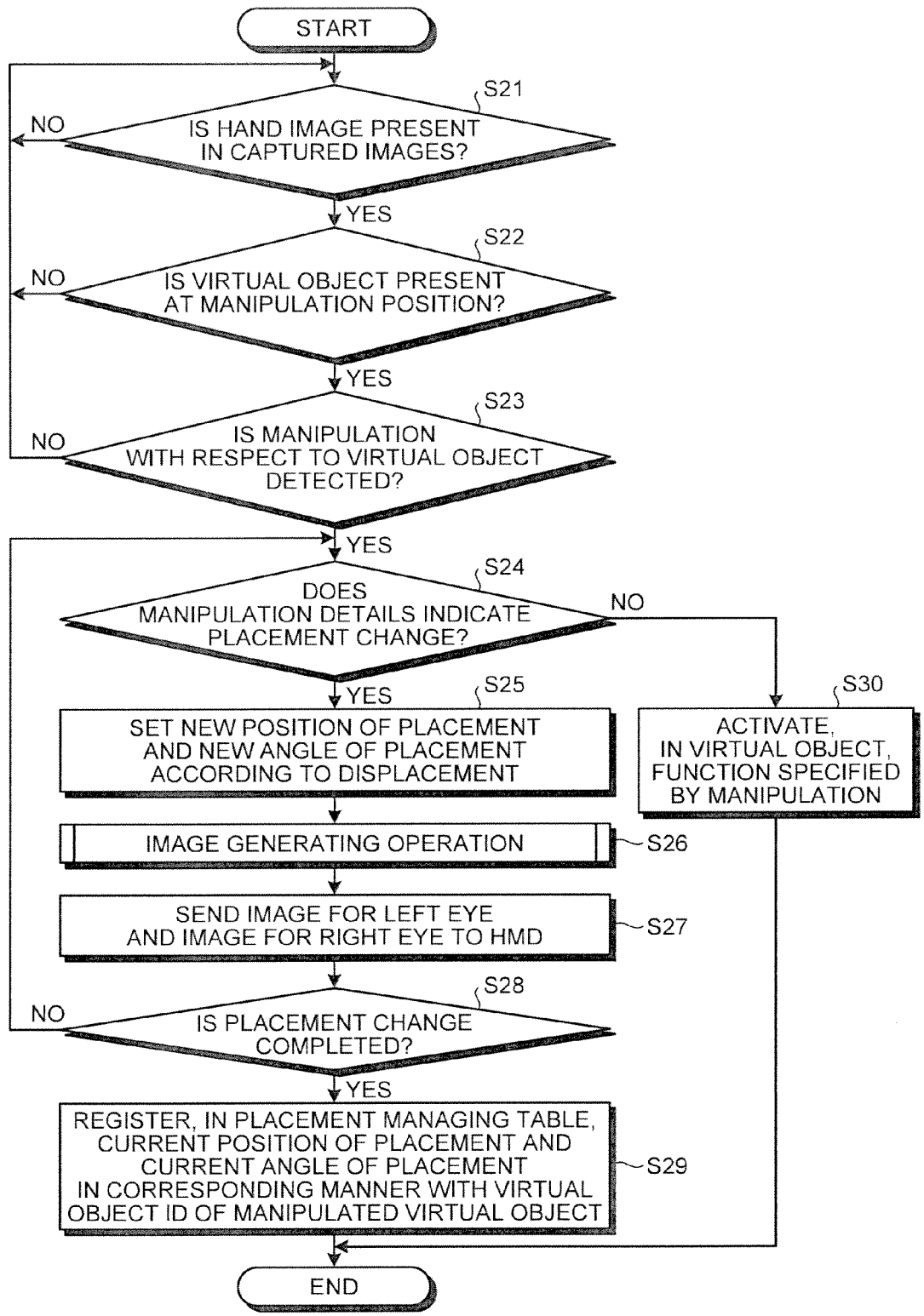
FIG. 10 is a flowchart for explaining the sequence in a virtual object manipulating operation in the first embodiment.

Explained below with reference to FIG. 10 is the virtual object manipulating operation performed at the time of manipulating a virtual object. FIG. 10 is a flowchart for explaining the sequence in the virtual object manipulating operation performed by the control module 21. The virtual object manipulating operation is performed in the background of the information presenting operation described above and performed on the premise that a virtual object is being presented because of the information presenting operation.

Firstly, the virtual object processing module 205 waits until the image analyzing module 203 detects a hand image in the captured images (No at S21). When a hand image is found (Yes at S21), the virtual object processing module 205 determines whether a virtual object is present at the manipulation position identified by the manipulation position identifying module 204 (S22). If no virtual object is present (No at S22), then the system control returns to S21.

On the other hand, if a virtual object is present (Yes at S22), then the virtual object processing module 205 determines, based on the finger movement detection result obtained by the image analyzing module 203, whether predetermined manipulation has been performed on that virtual object (S23). If the image analyzing module 203 does not detect any finger movements (No at S23), then the system control returns to S21.

On the other hand, if predetermined manipulation is determined to have been performed on the virtual object (Yes at S23), the virtual object processing module 205 determines whether the details of manipulation with finger movements indicate an instruction for placement change with respect to the virtual object (S24). For example, when the fingers are moved to pick the virtual object, the virtual object processing module 205 determines that a placement change has been instructed with respect to the virtual object.

When the details of manipulation with finger movements indicate an instruction for placement change with respect to the virtual object (Yes at S24), the virtual object processing module 205 sets a new position of placement and a new angle of placement according to the displacement in the position of placement detected by the manipulation position identifying module 204 and the rotation amount of the hand image detected by the image analyzing module 203 (S25).

Subsequently, the virtual object processing module 205 performs the image generating operation with the new position of placement and the new angle of placement set at S25, and generates a post-placement-change image for left eye and a post-placement-change image for right eye (S26) and outputs those images to the HMD 10 (S27). In this manner, the user instruction regarding placement change can be implemented and a post-placement-change virtual object can be presented to the user.

Then, the virtual object processing module 205 determines whether the placement change with respect to the virtual object is completed (S28). For example, when the fingers are moved to release the picked virtual object, the virtual object processing module 205 determines that the placement change is completed.

If it is determined that the placement change is not yet completed (No at S28), the system control returns to S24. On the other hand, if it is determined that the placement change is completed (Yes at S28), the virtual object processing module registers, in the placement managing table 232, the current position of placement and the current angle of placement in a corresponding manner with the virtual object ID of the virtual object that was the target of manipulation (S29). That marks the end of the virtual object manipulating operation.

Meanwhile, at S24, if the details of manipulation with finger movements indicate an instruction to make use of predetermined function of the virtual object (No at S24), then the virtual object processing module 205 activates the specified function in the virtual object to be manipulated (S30) and ends the virtual object manipulating operation.

Herein, it is assumed that the functions of a virtual object are included as programs in the actual data of that virtual object. Moreover, if activation of a function has the purpose of changing the shape of a virtual object, then the shape of that virtual object is changed according to the details of manipulation.

Figure 8C:
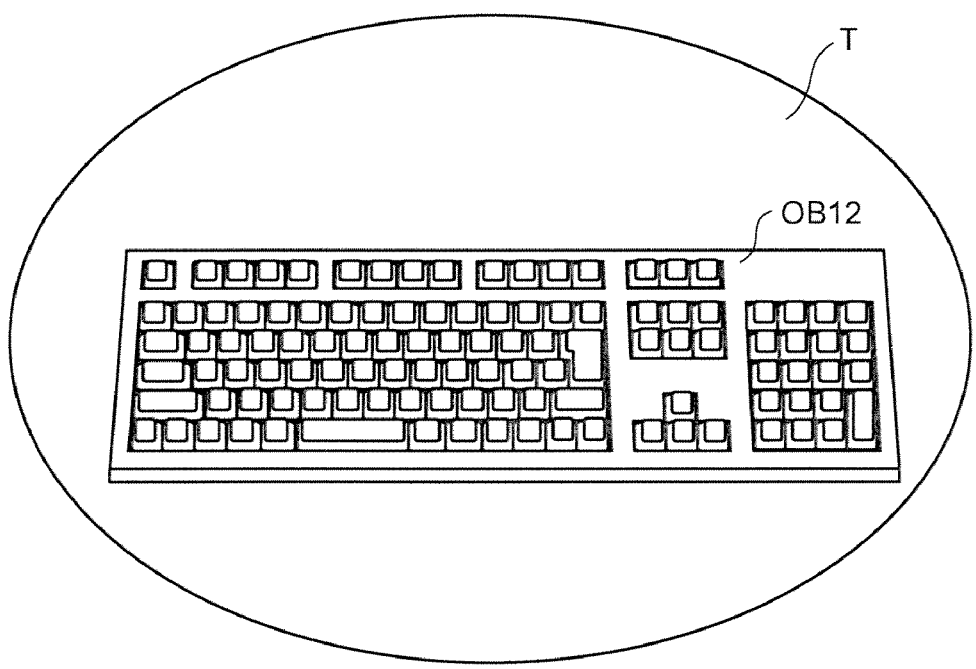
FIG. 8C is another exemplary illustration of a virtual object presented to the user illustrated in FIG. 8A in the first embodiment.

For example, consider the case of the virtual object OB12 representing a keyboard as illustrated in FIG. 8C. In that case, if pressing of a finger at a particular key position is detected, the character or symbol allotted to that key is input. Moreover, in the case of the virtual object OB13 representing an analog clock as illustrated in FIG. 9B, if a finger overlapping with the hour hand or the minute hand is detected to have been slid in the clockwise direction or in the anticlockwise direction; the display position of the hour hand or the minute hand is changed according to the sliding amount.

In this way, by performing the virtual object manipulating operation according to the present embodiment, a placement change with respect to a virtual object can be performed with intuitive manipulation. That enables achieving enhancement in the user-friendliness.

Meanwhile, in the present embodiment, a virtual object is manipulated by the user with hands. Alternatively, it is also possible to manipulate a virtual object with the use of a manipulation instructing tool such as a stylus pen. In that case, an existence position detecting device such as a digitizer that measures the position of existence in the real-world space can be attached to the manipulation instruction tool so that the manipulation position or the manipulation details can be identified using the existence position information obtained from the position detecting device.

Figure 11:
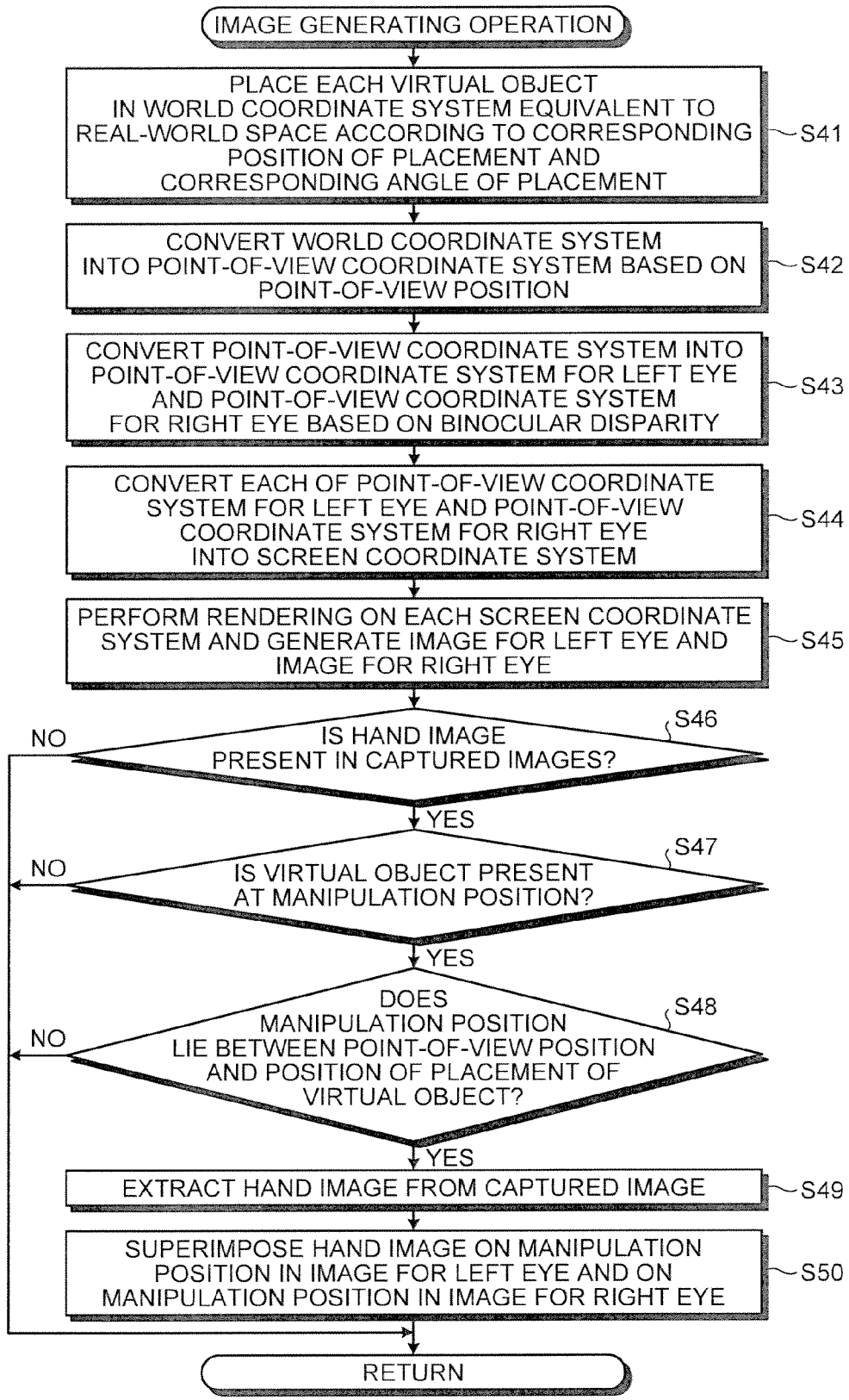
FIG. 11 is an exemplary flowchart for explaining the sequence in the image generating operation according to a modification example of the first embodiment.

In the information presenting operation (image generating operation) described above, if the hands of the user come in between the position of the point of view of the user and the position of placement of a virtual object; then that virtual object appears on the hands of the user in a superimposed manner. At that time, there is a possibility that inconsistency in the visual sense of depth spoils the sense of reality of the virtual object. However, even if such a situation arises, the sense of reality of the virtual object can be enhanced by making the virtual object look like it is not superimposed on the hands of the user. The image generating operation performed to achieve such a solution is explained below as a modification example of the present embodiment FIG. 11 is an exemplary flowchart for explaining the sequence in the image generating operation according to the modification example of the present embodiment. With reference to FIG. 11, S41 to S45 are identical to S171 to S175 described above. Hence, the explanation thereof is not repeated.

Upon generating an image for left eye and an image for right eye at S45, the virtual object processing module 205 determines, based on the analysis result of the image analyzing module 203, whether the captured images include hand images (S46). If no hand image is found in the captured images (No at S46), the image generating operation is terminated.

On the other hand, if hand images are found in the captured images (Yes at S46), then the virtual object processing module 205 determines whether a virtual object is present at the manipulation position identified by the manipulation position identifying module 204 (S47). If no virtual object is present at the manipulation position (No at S47), the image generating operation is terminated.

On the other hand, if a virtual object is present at the manipulation position (Yes at S47), then the virtual object processing module 205 determines whether the manipulation position of a hand image lies in between the point-of-view position and the position of placement of the virtual object (S48). If it is determined that, when viewed from the point-of-view position, the position of placement of the virtual object is in front of the manipulation position of the hand image (No at S48); then the image generating operation is terminated.

On the other hand, if it is determined that, when viewed from the point-of-view position, the manipulation position of the hand image is in front of the position of placement of the virtual object (Yes at S48); then the virtual object processing module 205 instructs the image analyzing module 203 to extract the hand image from the captured images (S49). Then, as the image processing, the virtual object processing module 205 superimposes the hand image extracted at S49 at the manipulation position in the image for left eye and the manipulation position in the image for right eye so that the hand image is presented in a superimposed manner at the position of the hand in the real-world space (S50). That marks the end of the image generating operation.

Figure 12:
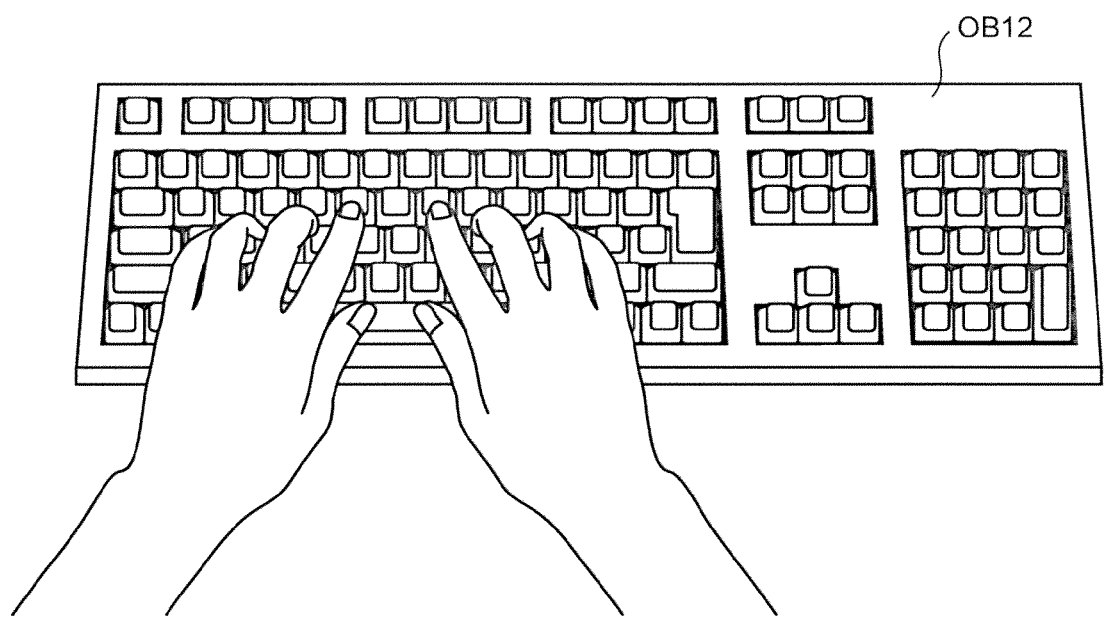
FIG. 12 is an exemplary illustration of an image for left eye and an image for right eye presented upon generation by implementing the image generating operation explained in FIG. 11 in the first embodiment.

FIG. 12 is an exemplary illustration of an image for left eye and an image for right eye presented upon generation by implementing the image generating operation according to the present modification example. As illustrated in FIG. 12, the virtual object OB12 representing a keyboard is displayed. Herein, if the hands of the user (manipulation position) come in between the position of the point of view of the user and position of placement of the virtual object OB12, then the image generating operation can be implemented to present the hand image in a superimposed manner on the hands of the user. Hence, if the hands of the user exist between the position of the point of view of the user and position of placement of a virtual object, it is possible to perform control in such a way that the virtual object is not superimposed on the hands of the user. That enables achieving enhancement in the sense of reality of the virtual object OB12.

Meanwhile, in the present modification example, a hand image from among the captured image is directly superimposed on the image for left eye and the image for right eye. Alternatively, based on the position of the image capturing module 18 and the interocular distance, the hand image can be first corrected so that it resembles to the shape of the hands when viewed from the left eye and resembles to the shape of the hands when viewed from the right eye, and then the corrected hand images can be superimposed on the image for left eye and the image for light eye, respectively.

Moreover, in the present modification example, by superimposing a hand image on the image for left eye and on the image for right eye, control can be performed so that the virtual object is not superimposed on the hands of the user. Alternatively, by clipping the region equivalent to the shape of the hand image from the positions corresponding to the manipulation positions in the image for left eye and the image for right eye, the region corresponding to hands of the user can be presented as blank.

Given below is the description according to a second embodiment. In the first embodiment described above, a virtual object is presented in a corresponding manner with a fixed position in the real-world space. In the second embodiment, a virtual object is presented in a corresponding manner with a physical object that moves within the real-world space (hereinafter, "moving object"). Meanwhile, in the second embodiment, the constituent elements identical to those described in the first embodiment are referred to by the same reference numerals and the explanation thereof is not repeated.

Figure 13:
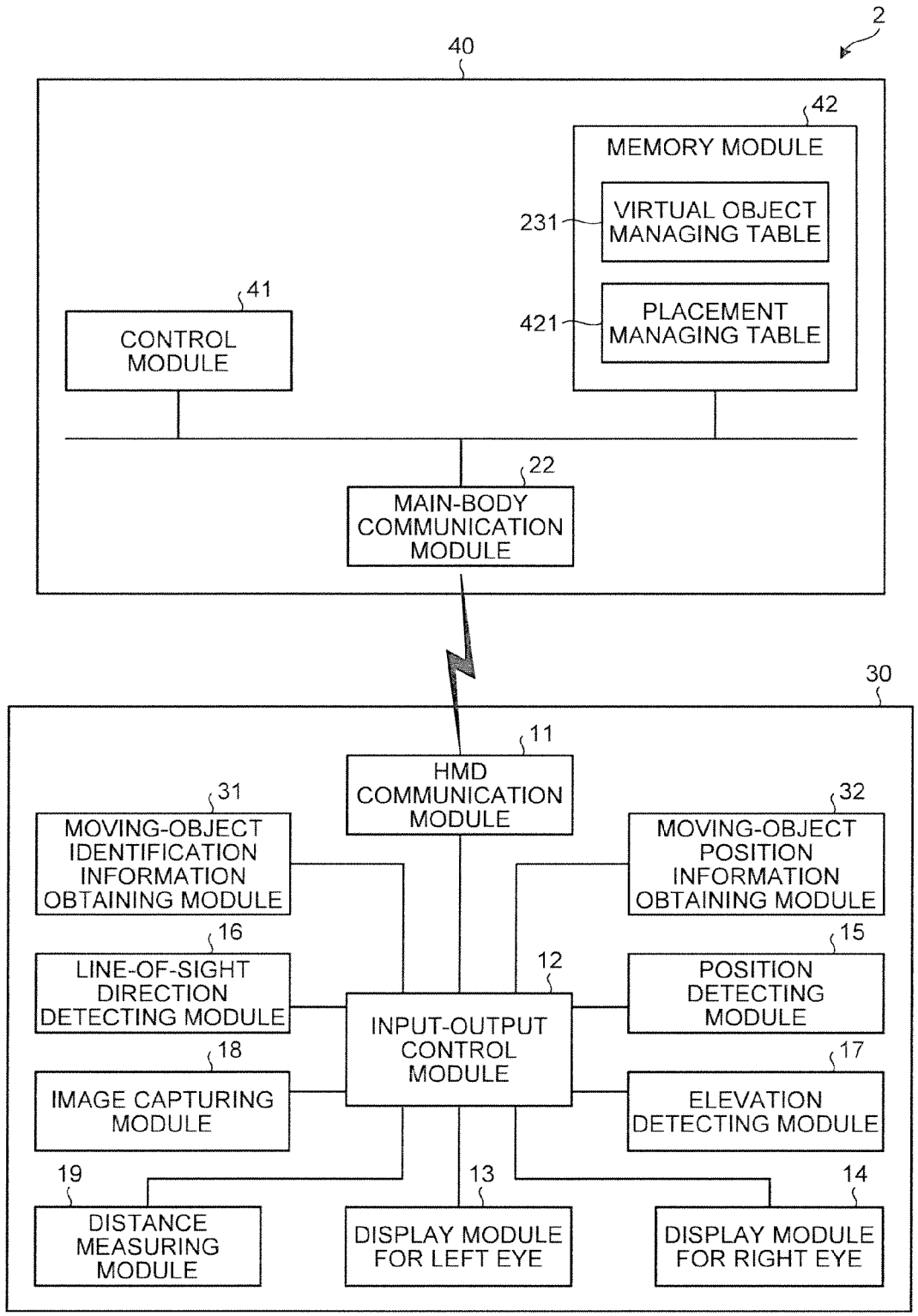
FIG. 13 is an exemplary block diagram of a hardware configuration of an information presenting apparatus according to a second embodiment.

FIG. 13 is an exemplary block diagram of a hardware configuration of an information presenting apparatus 2 according to the second embodiment. As illustrated in FIG. 13, the information presenting apparatus 2 comprises a transmissive HMD 30 and a main body 40. The connection relation between the HMD 30 and the main body 40 is identical to that in the information presenting apparatus 1.

As illustrated in FIG. 13, the HMD 30 comprises the HMD communication module 11, the input-output control module 12, the display module for left eye 13, the display module for right eye 14, the position detecting module 15, the line-of-sight direction detecting module 16, the elevation detecting module 17, the image capturing module 18, the distance measuring module 19, a moving-object identification information obtaining module 31, and a moving-object position information obtaining module 32.

The moving-object identification information obtaining module 31 is a functional module for obtaining moving object identification information that enables identification of a moving object such as an automobile that the user is boarding. The moving object identification information is then output to the input-output control module 12. Herein, the moving object identification information is, for example, the license number or the serial number of the automobile. Moreover, it is assumed that the moving-object identification information obtaining module 31 is put into practice with a configuration that is specific to the manner in which the moving object identification information is retained.

For example, if the identification information is retained as a character string on the moving object itself, then the moving-object identification information obtaining module 31 can be configured as a device for recognizing characters captured by the image capturing module 18 in order to obtain the identification information. Alternatively, if the identification information is retained in a coded form such as in a barcode or a two-dimensional code, then the moving-object identification information obtaining module 31 can be configured as a device for decoding barcodes or two-dimensional codes captured by the image capturing module 18 in order to obtain the identification information. Moreover, if the identification information is retained in a radio-frequency identification (REID) tag, then the moving-object identification information obtaining module 31 can be configured as an REID reader device in order to obtain the identification information.

The moving-object position information obtaining module 32 obtains the position of existence of the moving object in the real-world space and outputs it as moving object existence position information to the input-output control module 12. In the present embodiment, it is assumed that the moving object to be boarded is equipped with an existence position detecting device such as a GPS receiver and that the moving-object position information obtaining module 32 obtains the existence position information (e.g., latitude/longitude) of the moving object detected by the existence position detecting device. There are no particular limitations on the method implemented to obtain the existence position information from the existence position detecting device. For example, the moving-object position information obtaining module 32 can be configured to access the existence position detecting device in the moving object for directly obtaining the existence position information.

In the present embodiment, the moving-object identification information obtaining module 31 and the moving-object position information obtaining module 32 are disposed in the HMD 30. Alternatively, if the main body 40 is configured to be portable by the user, the moving-object identification information obtaining module 31 and the moving-object position information obtaining module 32 can be disposed in the main body 40. Still alternatively, the moving-object identification information obtaining module 31 and the moving-object position information obtaining module 32 can be disposed independent of the HMD 30 and the main body 40.

Meanwhile, the main body 40 comprises a control module 41, the main-body communication module 22, and a memory module 42. The control module 41 comprises a CPU (not illustrated), a GPU (not illustrated), a ROM (not illustrated), and a RAM (not illustrated). In cooperation with predetermined programs stored in the memory module 42, the control module 41 intensively controls the operations of each constituent element of the main body 40. Moreover, in cooperation with predetermined programs stored in the memory module 42, the control module 41 puts into practice the functional modules described later (see FIG. 15) and executes various operations such as the information presenting operation (see FIG. 16) or the virtual object manipulating operation (see FIG. 10).

The memory module 42 comprises a memory device (not illustrated) such as an HDD or an SSD that is used to store various programs executed by the control module 21 or a variety of setting information. Besides, in the memory module 23 are stored the virtual object managing table 231 and a placement managing table 421.

Figure 14:
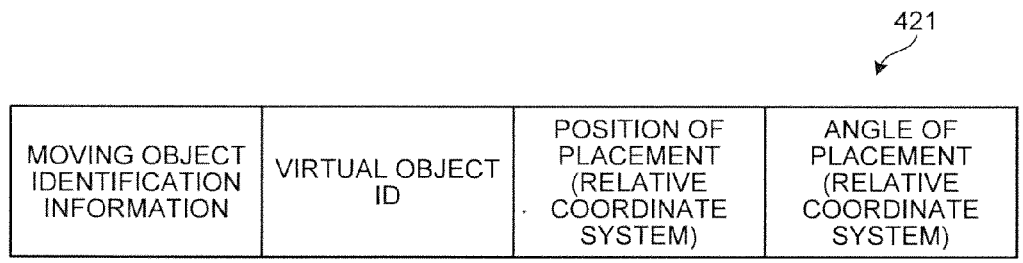
FIG. 14 is an exemplary schematic diagram of data configuration of a placement managing table stored in a memory module illustrated in FIG. 13 in the second embodiment.

FIG. 14 is an exemplary schematic diagram of data configuration of the placement managing table 421. As illustrated in FIG. 14, in the placement managing table 421, the moving object identification information, the virtual object IDs, the positions of placement of the virtual objects in relative space coordinates (described later), and the angles of placement at those positions placement are registered in a corresponding manner.

Figure 15:
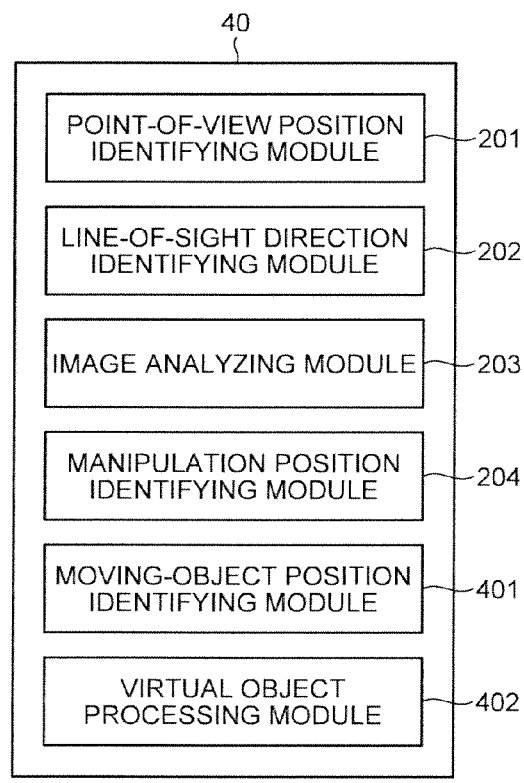
FIG. 15 is an exemplary schematic diagram of a functional configuration of a main body in the second embodiment.

FIG. 15 is an exemplary block diagram of a functional configuration of the main body 40. As illustrated in FIG. 15, as a result of coordinated processing by the control module 41 and predetermined programs stored in the memory module 42, the main body 40 comprises the point-of-view position identifying module 201, the line-of-sight direction identifying module 202, the image analyzing module 203, the manipulation position identifying module 204, a moving-object position identifying module 401, and a virtual object processing module 402 as the functional modules.

The moving-object position identifying module 401 identifies the position of existence in the horizontal direction of a moving object based on the moving object existence position information obtained by the moving-object position information obtaining module 32.

The virtual object processing module 402 sets, based on the position of existence of the user and the position of existence of the moving object, a relative coordinate system (described later) that represents the relative position relation between the position of existence of the user and the position of existence of the moving object. Moreover, based on the position of the point of view and the direction of the line of sight of the user wearing the HMD 30, the virtual object processing module 402 identifies the visibility range of that user in the relative coordinate system in an identical manner to that of the virtual object processing module 205. The virtual object processing module 402 then places, in the relative coordinate system, the virtual objects at the positions of placement included in the visibility range so that the virtual objects get virtually placed in the real-world space. Moreover, based on the virtual objects placed virtually in the real-world space, the virtual object processing module 402 generates an image for left eye and an image for right eye that represent the placement status of each virtual object when viewed from the left eye and the right eye, respectively, of the user and then outputs those images to the HMD 30.

Furthermore, according to the details of manipulation with finger movements detected by the image analyzing module 203, the virtual object processing module 402 performs predetermined operations on the virtual objects that were the targets of manipulation in an identical manner to that of the virtual object processing module 205.

Figure 16:
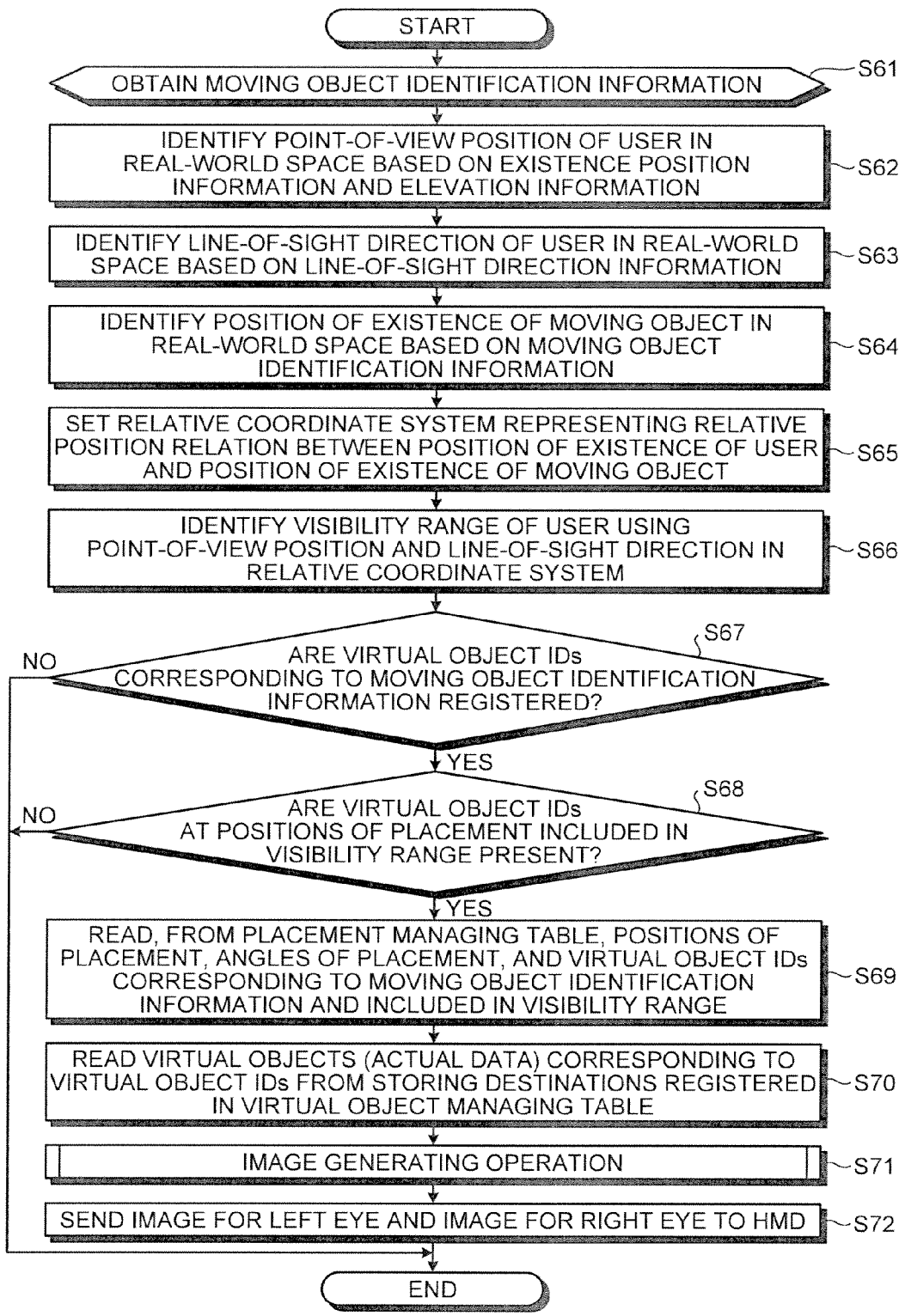
FIG. 16 is an exemplary flowchart for explaining the sequence in an information presenting operation in the second embodiment.

Explained below with reference to FIG. 16 are the operations performed by the information presenting apparatus 2 according to the present embodiment. FIG. 16 is an exemplary flowchart for explaining the sequence in the information presenting operation. Herein, as the precondition for performing the information presenting operation, it is assumed that the user wearing the HMD 30 is boarding a moving object and the moving-object identification information obtaining module 31 obtains the moving object identification information regarding that moving object (S61).

Firstly, the point-of-view position identifying module 201 identifies, based on the existence position information and the elevation information input from the HMD 30, the position of the point of view of the user in the real-world space (S62). The line-of-sight direction identifying module 202 then identifies the direction of the line of sight of the user in the real-world space based on the line-of-sight direction information input from the HMD 30 (S63). The moving-object position identifying module 401 identifies the position of existence of the moving object in the real-world space based on the moving object existence position information input from the HMD 30 (S64).

Subsequently, the virtual object processing module 402 sets a relative coordinate system that represents the relative position relation between the position of existence of the user and the position of existence of the moving object (S65).

Figure 17:
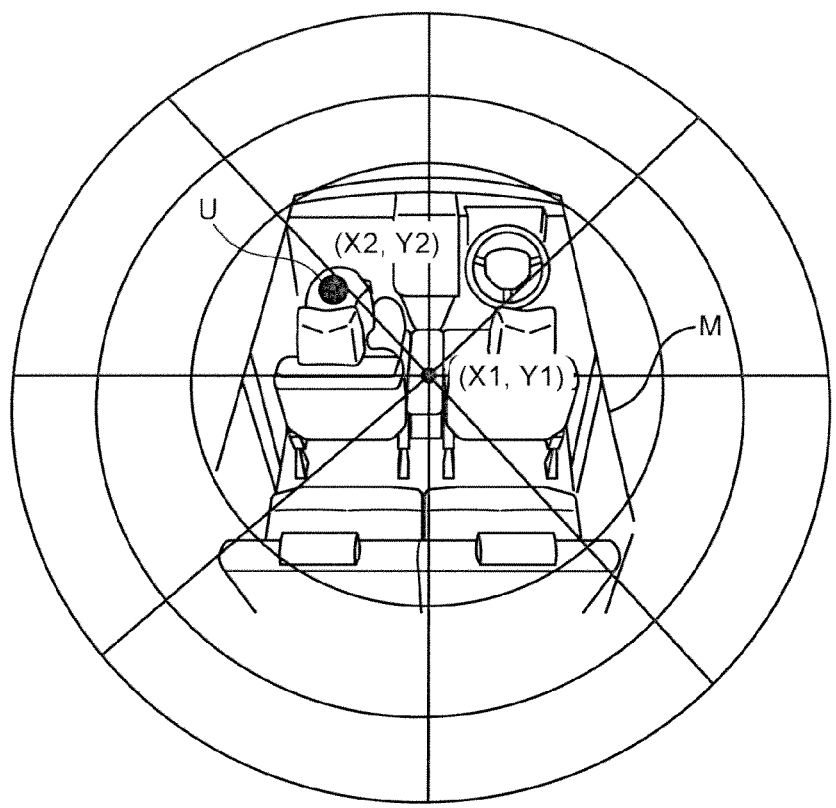
FIG. 17 is an exemplary diagram illustrating a position relation between a moving object and a user in the real-world space in the second embodiment.
Figure 18:
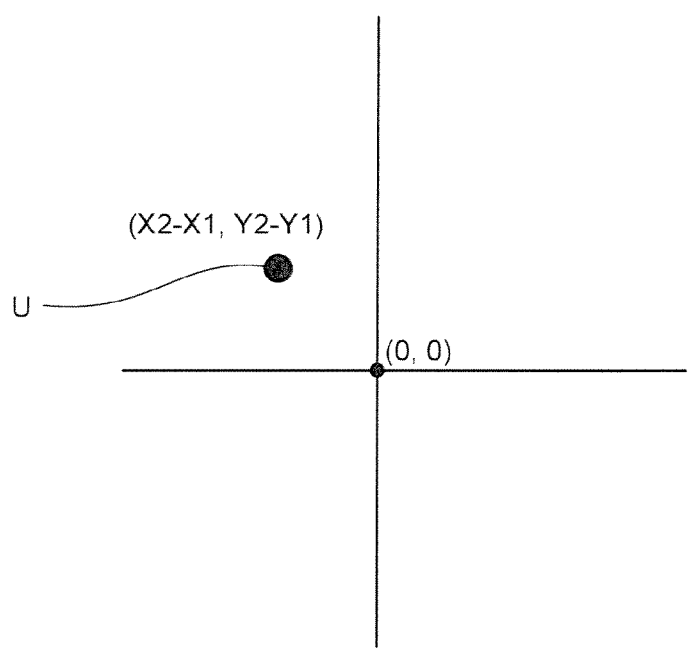
FIG. 18 is an exemplary diagram illustrating a position relation between a moving object and a user in a relative coordinate system in the second embodiment.

For example, if the position of existence of the moving object in the real-world space is (X1, Y1) and the position of existence of the user in the real-world space is (X2, Y2) as illustrated in FIG. 17, then the position of existence of the moving object (X1, Y1) is subtracted from both the positions of existence (S65). Then, as illustrated in FIG. 18, a relative coordinate system is set in which the current position of the moving object is at the origin (0, 0) and the current position of the user is at (X2-X1, Y2-Y1). Thus, in the present embodiment, the current position of the moving object is set to the origin. Alternatively, a relative coordinate system can also be set in which the current position of the user is at the origin.

Returning to the explanation with reference to FIG. 16, the virtual object processing module 402 identifies the visibility range of the user in the relative coordinate system based on the position of the point of view and the direction of the line of sight of the user identified at S62 and S63 (366). Then, based on the moving object identification information obtained by the moving-object identification information obtaining module 31, the virtual object processing module 402 determines whether the virtual object IDs corresponding to that moving object identification information are registered in the placement managing table 421 (S67). If no registration is found (No at S67), the information presenting operation is terminated.

On the other hand, if the moving object identification information is determined to have been registered (Yes at S67), then the virtual object processing module 402 determines whether the virtual object IDs corresponding to the moving object identification information include the virtual object IDs at the positions of placement included in the visibility range that has been identified at S66 (S68). If no such virtual object IDs are found (No at S68), the information presenting operation is terminated.

On the other hand, if such virtual object IDs are found (Yes at S68), the virtual object processing module 402 reads those virtual object IDs, the respective positions of placement, and the respective angles of placement from the placement managing table 421 (S69).

Subsequently, the virtual object processing module 402 refers to the virtual object managing table 231 and reads, from the storing destinations of the virtual object IDs, the virtual objects (actual data) corresponding to the virtual object IDs (S70), and performs an image generating operation for generating an image for left eye and an image for right eye (S71). The explanation of the image generating operation performed at S71 is given below with reference to FIG. 19.

FIG. 19 is an exemplary flowchart for explaining the sequence in the image generating operation performed at S71. Firstly, by using the positions of placement and the angles of placement of the virtual object IDs read at S70, the virtual object processing module 402 places the virtual objects corresponding to those virtual object IDs at the corresponding positions in the relative coordinate system (S711).

Subsequently, in order to make the placement status of each virtual object placed in the relative coordinate system equivalent to the view from the position of the point of view of the user, the virtual object processing module 402 converts the relative coordinate system into a point-of-view coordinate system based on the position of the point of view of the user (S712).

Then, based on the binocular disparity determined by the interocular distance of the user, the virtual object processing module 402 shifts the position of the origin (point-of-view position) in the point-of-view coordinate system to left and right by an amount determined according to the binocular disparity, and generates a point-of-view coordinate system for left eye representing the placement status of each virtual object when viewed from the left eye of the user and generates a point-of-view coordinate system for right eye representing the placement status of each virtual object when viewed from the right eye of the user (S713).

Subsequently, the virtual object processing module 402 converts each of the point-of-view coordinate system for left eye and the point-of-view coordinate system for right eye into a screen coordinate system according to the display module for left eye 13 and the display module for right eye 14, respectively (S714). Then, the virtual object processing module 402 generates an image for left eye by rendering the point-of-view coordinate system for left eye that has been converted into the screen coordinate system and generates an image for right eye by rendering the point-of-view coordinate system for right eye that has been converted into the screen coordinate system (S715) and proceeds to S72 illustrated in FIG. 16.

Returning to the explanation with reference to FIG. 16, the virtual object processing module 402 sends the image for left eye and the image for right eye generated in the image generating operation at S71 to the HMD 30 and instructs the HMD 30 to display the image for left eye on the display module for left eye 13 and the image for right eye on the display module for right eye 14 (S72). That marks the end of the information presenting operation.

Explained below with reference to FIG. 20 (FIGS. 20A, and 20B) is an example of presenting a virtual object by implementing the information presenting operation according to the present embodiment.

Figure 20A:
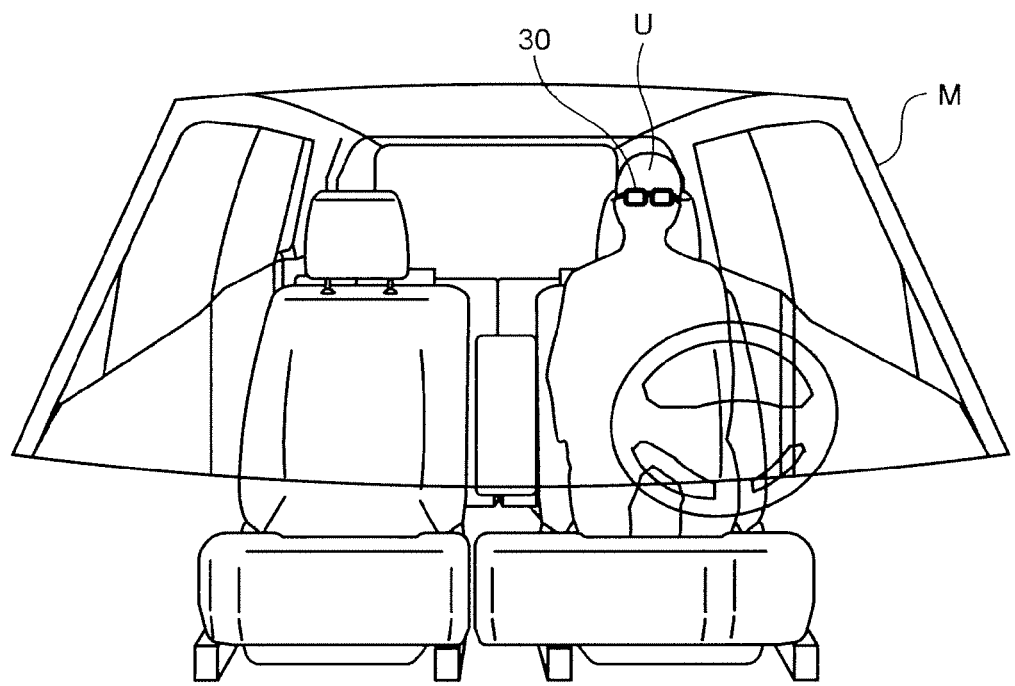
FIG. 20A is an exemplary pictorial diagram for explaining the relation between a user wearing an HMD and a moving object that the user is boarding in the second embodiment.
Figure 20B:
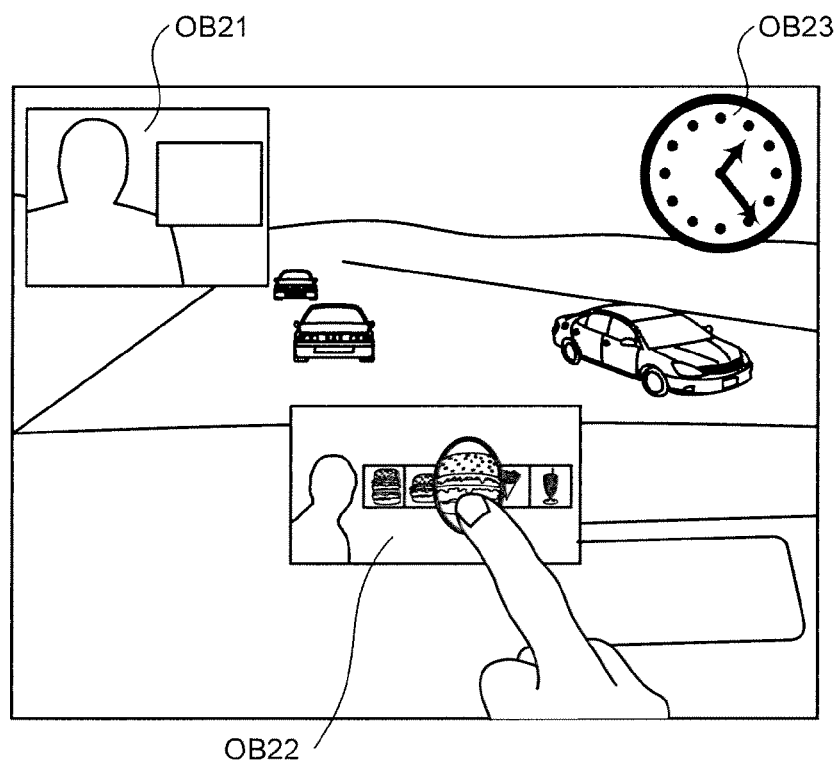
FIG. 20B is an exemplary diagram illustrating virtual objects presented to the user illustrated in FIG. 20A in the second embodiment.

FIG. 20A is an exemplary pictorial diagram for explaining the relation between a user U wearing the HMD 30 and a moving object (automobile) M that the user U is boarding. As illustrated in FIG. 20A, the line-of-sight direction of the user U is directed toward the front direction (travelling direction) of the moving object M. Herein, it is assumed that virtual object IDs are registered in a corresponding manner with the moving object identification information regarding the moving object M in the placement managing table 421. Moreover, it is assumed that the visibility range of the user U includes the positions of placement corresponding to three virtual object IDs. In that case, the information presenting operation is performed so that virtual objects OB21 to OB23 are displayed in front of the eyes of the user U as illustrated in FIG. 20B. As illustrated in FIG. 20B, the virtual object OB21 is used for displaying television broadcast, the virtual object OB22 is used for ordering products from predetermined shops, and the virtual object OB23 represents an analog clock.

In this way, by implementing the information presenting operation according to the present embodiment, it becomes possible to place virtual objects in a moving object based on the relative position relation between a user wearing the HMD 30 and the moving object moving within the real-world space. Hence, the virtual objects can be presented while maintaining their association with the moving object.

Meanwhile, in the second embodiment, the virtual object manipulating operation according to the first embodiment can be implemented as it is except for the fact that the existence position information such as the manipulation positions is changed to the existence position information in the relative coordinate system. Hence, the explanation of the virtual object manipulating operation is not repeated.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, in the abovementioned embodiments, the programs to be executed for a variety of operations are stored in advance in the memory module 23 or the memory module 42. However, alternatively, those programs can also be provided in the form of installable or executable files on a computer-readable storage device such as a compact disk read only memory (CD-ROM), a flexible disk (FD), a compact disk recordable (CD-R), or a digital versatile disk (DVD).

Alternatively, the programs can be saved as downloadable files on a computer connected to Internet or can be made available for distribution through a network such as Internet.

To sum up, according to an aspect of the present invention, an information presenting apparatus, an information presenting method, and a computer program product can be provided for enhancing the user-friendliness at the time of presenting virtual objects placed virtually at predetermined positions in the real-world space.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information presenting apparatus for presenting information using a transmissive head-mounted display equipped with a display module for each eye of a wearer, the information presenting apparatus comprising:
a point-of-view position identifying module configured to identify a point-of-view position of the wearer based on position of existence and height of the head-mounted display in real-world space;
a line-of-sight direction identifying module configured to identify a line-of-sight direction of the wearer by making use of a tilt of the head-mounted display;
a moving-object position identifying module configured to identify a position of existence of a moving object that the wearer is boarding in the real-world space;
a relative coordinate system setting module configured to set a relative coordinate system representing a relative position relation between the position of existence of the head-mounted display and the position of existence of the moving object;
a visibility range identifying module configured to identify visibility range of the wearer in the relative coordinate system based on the point-of-view position and the line-of-sight direction;
a memory module configured to store, in a corresponding manner, a virtual object representing a predetermined target and a position of placement in the relative coordinate system of the virtual object;
a placement module configured to read, from the memory module, a virtual object at a position of placement that is included in the visibility range and is represented in the relative coordinate system and, based on the position of placement associated with the virtual object, to virtually place the virtual object at a corresponding position in the relative coordinate system;
an image generating module configured to generate an image for left eye and an image for right eye that represent a placement status of the virtual object when viewed from a left eye and a right eye, respectively, of the wearer; and
a display control module configured to display the image for left eye on the display module disposed for the left eye of the wearer and to display the image for right eye on the display module disposed for the right eye of the wearer.

2. The information presenting apparatus of claim 1, further comprising:
a manipulation position identifying module configured to identify a manipulation position in the visibility range at which the wearer performs predetermined manipulation;
a placement relation determining module configured to determine whether the virtual object placed virtually by the placement module is present at the manipulation position; and
an operation module configured to perform, when the placement relation determining module determines that the virtual object is present at the manipulation position, an operation on the virtual object according to details of the manipulation.

3. The information presenting apparatus of claim 2, wherein, when manipulation on the virtual object results in a placement change with respect to the virtual object, the operation module stores, in the memory module, a post-placement-change manipulation position identified by the manipulation position identifying module as a new position of placement.

4. The information presenting apparatus of claim 2, further comprising:
an image capturing module configured to capture an image within the visibility range;
a hand image determining module configured to determine whether the image captured by the image capturing module include a hand image representing a hand of the wearer; and
a distance measuring module configured to measure a distance from the head-mounted display to a physical object present within the visibility range, wherein
when the hand image determining module determines that the hand image is present, the manipulation position identifying module sets, as the manipulation position, a position of the hand of the wearer in the real-world space identified based on a position of the hand image in the captured image and based on the distance measured by the distance measuring module.

5. The information presenting apparatus of claim 4, further comprising a superimposing module configured to superimpose, when the placement relation determining module determines that the manipulation position lies between the point-of-view position of the wearer and the position of placement of the virtual object, the hand image at a position corresponding to the manipulation position in each of the image for left eye and the image for right eye.

6. The information presenting apparatus of claim 4, further comprising a clipping module configured to clip, when the placement relation determining module determines that the manipulation position lies between the point-of-view position of the wearer and the position of placement of the virtual object, a region equivalent to shape of the hand image from a position corresponding to the manipulation position in each of the image for left eye and the image for right eye.

7. The information presenting apparatus of claim 1, further comprising a moving-object identification information obtaining module configured to obtain, from the moving object, moving object identification information used in identifying the moving object, wherein the memory module is configured to store therein the virtual object in a corresponding manner with the moving object identification information, and the placement module is configured to read, from the memory module, a virtual object that corresponds to the moving object identification information obtained by the moving-object identification information obtaining module and that lies at a position of placement included in the visibility range and represented in the relative coordinate system.

8. The information presenting apparatus of claim 1, wherein the memory module is configured to store therein an angle of placement in a corresponding manner with each of the virtual object, and the placement module is configured to place the virtual object as a placement target at an angle of placement associated with the virtual object.

9. An information presenting method for presenting information using a transmissive head-mounted display equipped with a display module for each eye of a wearer, the information presenting method comprising:

identifying, by a point-of-view position identifying module, that includes identifying a point-of-view position of the wearer based on position of existence and height of the head-mounted display in real-world space;

identifying, by a line-of-sight direction identifying module, that includes identifying a line-of-sight direction of the wearer by making use of a tilt of the head-mounted display;

identifying, by a moving-object position identifying module, that includes identifying a position of existence of a moving object that the wearer is boarding in the real-world space;

setting, by a relative coordinate system setting module, that includes setting a relative coordinate system representing a relative position relation between the position of existence of the head-mounted display and the position of existence of the moving object;

identifying, by a visibility range identifying module, that includes identifying visibility range of the wearer in the relative coordinate system based on the point-of-view position and the line-of-sight direction;

placing, by a placement module, that includes reading, from a memory module storing, in a corresponding manner, a virtual object representing a predetermined target and a position of placement in the relative coordinate system of the virtual object, a virtual object at a position of placement that is included in the visibility range and is represented in the relative coordinate system and, based on the position of placement associated with the virtual object, virtually placing the virtual object at a corresponding position in the relative coordinate system;

generating, by an image generating module, an image for left eye and an image for right eye that represent a placement status of the virtual object when viewed from a left eye and a right eye, respectively, of the wearer; and display-controlling, by a display control module, that includes displaying the image for left eye on the display module disposed for the left eye of the wearer and displaying the image for right eye on the display module disposed for the right eye of the wearer.

10. A non-transitory computer readable medium including programmed instructions that, when executed by a computer of an information presenting apparatus for presenting information using a transmissive head-mounted display equipped with a display module for each eye of a wearer, cause the computer to perform:

identifying, by a point-of-view position identifying module, that includes identifying a point-of-view position of the wearer based on position of existence and height of the head-mounted display in real-world space;

identifying, by a line-of-sight direction identifying module, that includes identifying a line-of-sight direction of the wearer by making use of a tilt of the head-mounted display;

identifying, by a moving-object position identifying module, that includes identifying a position of existence of a moving object that the wearer is boarding in the real-world space;

setting, by a relative coordinate system setting module, that includes setting a relative coordinate system representing a relative position relation between the position of existence of the head-mounted display and the position of existence of the moving object;

identifying, by a visibility range identifying module, that includes identifying visibility range of the wearer in the relative coordinate system based on the point-of-view position and the line-of-sight direction;

placing, by a placement module, that includes reading, from a memory module storing, in a corresponding manner, a virtual object representing a predetermined target and a position of placement in the relative coordinate system of the virtual object, a virtual object at a position of placement that is included in the visibility range and is represented in the relative coordinate system and, based on the position of placement associated with the virtual object, virtually placing the virtual object at a corresponding position in the relative coordinate system;

generating, by an image generating module, an image for left eye and an image for right eye that represent a placement status of the virtual object when viewed from a left eye and a right eye, respectively, of the wearer; and display-controlling, by a display control module, that includes displaying the image for left eye on the display module disposed for the left eye of the wearer and displaying the image for right eye on the display module disposed for the right eye of the wearer.

* * * * *